(12) United States Patent
Osman et al.

(10) Patent No.: US 12,059,624 B2
(45) Date of Patent: Aug. 13, 2024

(54) GENERATION OF AN ARTIFICIAL INTELLIGENCE (AI) MODEL FOR AUTOMATIC CONTROL OF CHARACTERS DURING GAME PLAYS OF GAMING APPLICATIONS

(71) Applicant: Sony Interactive Entertainment Inc., Tokyo (JP)

(72) Inventors: Steven Osman, San Francisco, CA (US); Jeffrey R. Stafford, Redwood City, CA (US); Javier F. Rico, Pacifica, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/863,350

(22) Filed: Jul. 12, 2022

(65) Prior Publication Data
US 2022/0362675 A1 Nov. 17, 2022

Related U.S. Application Data

(63) Continuation of application No. 17/112,513, filed on Dec. 4, 2020, now Pat. No. 11,383,167, which is a (Continued)

(51) Int. Cl.
*A63F 13/67* (2014.01)
*A63F 13/422* (2014.01)
(Continued)

(52) U.S. Cl.
CPC ............ *A63F 13/67* (2014.09); *A63F 13/422* (2014.09); *A63F 13/45* (2014.09); *A63F 13/5375* (2014.09)

(58) Field of Classification Search
CPC .......... A63F 13/67; A63F 13/13; A63F 13/45; A63F 13/422; A63F 13/537; G06N 3/08;
(Continued)

(56) References Cited

U.S. PATENT DOCUMENTS

RE34,728 E * 9/1994 Hall-Tipping .......... A63F 13/57
482/8
5,395,242 A * 3/1995 Slye ...................... A63F 13/497
463/43
(Continued)

*Primary Examiner* — David L Lewis
*Assistant Examiner* — Matthew D Hoel
(74) *Attorney, Agent, or Firm* — PENILLA IP, APC

(57) ABSTRACT

A method for gaming. The method includes assigning a default game play profile to a user, wherein the default game play profile includes a default game play style that simulates human game play, and wherein the default game play profile is configured to control game play for the user based on the default game play style. The method includes monitoring a plurality of game plays of the user playing a plurality of gaming applications. The method includes generating a user game play profile of the user by adjusting the default game play style based on the plurality of game plays, wherein the user game play profile incudes a user game play style customized to the user. The method includes controlling an instance of a first gaming application based on the user game play style of the user game play profile.

20 Claims, 8 Drawing Sheets

Related U.S. Application Data continuation of application No. 15/426,581, filed on Feb. 7, 2017, now Pat. No. 10,888,788.

(60) Provisional application No. 62/357,290, filed on Jun. 30, 2016.

(51) Int. Cl.
*A63F 13/45* (2014.01)
*A63F 13/5375* (2014.01)

(58) Field of Classification Search
CPC ........ G06N 3/045; G06N 20/00; G06N 3/084; G06N 3/044
See application file for complete search history.

(56) References Cited

U.S. PATENT DOCUMENTS

| | | | | |
|---|---|---|---|---|
| 5,592,609 | A * | 1/1997 | Suzuki | A63F 13/63 463/31 |
| 5,797,796 | A * | 8/1998 | Dickinson | G07F 17/3272 463/43 |
| 5,830,067 | A * | 11/1998 | Graves | G07F 17/32 463/19 |
| 5,941,770 | A * | 8/1999 | Miers | G07F 17/3276 463/13 |
| 6,018,121 | A * | 1/2000 | Devecka | G10H 1/0016 84/743 |
| 6,024,643 | A * | 2/2000 | Begis | A63F 13/798 463/1 |
| 6,080,063 | A * | 6/2000 | Khosla | A63F 13/45 463/42 |
| 6,106,395 | A * | 8/2000 | Begis | A63F 13/12 463/23 |
| 6,241,524 | B1* | 6/2001 | Aoshima | A63F 13/45 463/6 |
| 6,264,198 | B1* | 7/2001 | Stamper | A63F 13/54 463/31 |
| 6,306,038 | B1* | 10/2001 | Graves | G07F 17/32 463/19 |
| 6,652,376 | B1* | 11/2003 | Yoshida | A63F 13/65 463/6 |
| 6,663,492 | B2* | 12/2003 | Thompson | A63F 13/45 463/43 |
| 6,709,331 | B2* | 3/2004 | Berman | G07F 17/32 463/16 |
| 7,175,522 | B2* | 2/2007 | Hartl | A63F 3/00157 463/13 |
| 7,559,834 | B1* | 7/2009 | York | A63F 13/10 463/2 |
| 7,883,419 | B2* | 2/2011 | Cheung | A63F 13/332 463/43 |
| 8,226,485 | B1* | 7/2012 | Mooney | A63F 13/795 463/42 |
| 8,226,486 | B2* | 7/2012 | Mooney | A63F 13/795 463/42 |
| 8,226,487 | B2* | 7/2012 | Mooney | A63F 13/795 463/42 |
| 8,292,736 | B2* | 10/2012 | Kato | A63F 13/20 463/31 |
| 8,357,040 | B2* | 1/2013 | Ansari | G07F 17/323 463/32 |
| 8,629,866 | B2* | 1/2014 | Betzler | A63F 13/52 715/757 |
| 8,702,513 | B2* | 4/2014 | Lim | G06F 3/04883 463/31 |
| 8,808,090 | B2* | 8/2014 | Myogan | A63F 13/60 463/31 |
| 8,814,704 | B2* | 8/2014 | Togashi | A63F 13/332 463/42 |
| 8,821,238 | B2* | 9/2014 | Ackley | A63F 1/14 273/149 R |
| 8,827,824 | B2* | 9/2014 | Bentley | G06V 40/23 473/266 |
| 8,894,489 | B2* | 11/2014 | Lim | A63F 13/214 463/31 |
| 8,905,855 | B2* | 12/2014 | Fitzpatrick | G06T 13/40 473/199 |
| 8,944,928 | B2* | 2/2015 | Kaps | G09B 19/0038 473/199 |
| 9,039,527 | B2* | 5/2015 | Bentley | A63F 13/573 463/31 |
| 9,682,323 | B2* | 6/2017 | Imai | G06F 8/63 |
| 10,046,241 | B1* | 8/2018 | Krosky | A63F 13/69 |
| 10,512,841 | B2* | 12/2019 | Colenbrander | A63F 13/49 |
| 10,569,174 | B1* | 2/2020 | Wheeler | A63F 13/42 |
| 10,617,961 | B2* | 4/2020 | Ma | A63F 13/847 |
| 10,632,382 | B2* | 4/2020 | Chou | A63F 13/28 |
| 10,698,661 | B2* | 6/2020 | Kim | H04L 67/75 |
| 10,728,826 | B2* | 7/2020 | Pennington | H04W 40/12 |
| 10,744,372 | B2* | 8/2020 | Meyerson | G06F 16/23 |
| 10,773,156 | B2* | 9/2020 | Colenbrander | H04L 67/14 |
| 10,878,656 | B2* | 12/2020 | Shigeta | G07F 17/3251 |
| 10,888,788 | B2 | 1/2021 | Osman | A63F 13/422 |
| 10,888,791 | B2* | 1/2021 | Krosky | A63F 13/69 |
| 10,894,215 | B1* | 1/2021 | Brown | A63F 13/35 |
| 10,916,089 | B2* | 2/2021 | Shigeta | G06Q 20/208 |
| 10,918,946 | B2* | 2/2021 | Jarzebinski | A63F 13/5375 |
| 10,946,281 | B2* | 3/2021 | Fear | G06N 3/045 |
| 10,956,833 | B1* | 3/2021 | Yamane | G06F 8/77 |
| 10,963,365 | B2* | 3/2021 | Phaneuf | G06F 11/3664 |
| 11,014,001 | B2* | 5/2021 | Li | A63F 13/65 |
| 11,020,658 | B2* | 6/2021 | Phaneuf | A63F 13/35 |
| 11,038,684 | B2* | 6/2021 | Shah | H04L 9/3247 |
| 11,077,375 | B2* | 8/2021 | Yang | A63F 13/57 |
| 11,083,961 | B2* | 8/2021 | Yeh | A63F 13/28 |
| 11,114,129 | B2* | 9/2021 | Nakatsuka | H04N 21/472 |
| 11,117,053 | B2* | 9/2021 | Noss | A63F 13/533 |
| 11,123,639 | B2* | 9/2021 | Sherwani | A63F 13/86 |
| 11,144,112 | B2* | 10/2021 | Zhu | G06T 19/20 |
| 11,167,214 | B1* | 11/2021 | White | G06N 3/006 |
| 11,213,746 | B2* | 1/2022 | Musbah | A63F 13/355 |
| 11,222,505 | B2* | 1/2022 | Wu | G07F 17/3227 |
| 11,237,872 | B2* | 2/2022 | Gupta | G06F 9/4881 |
| 11,247,100 | B2* | 2/2022 | Meyerson | G06F 16/23 |
| 11,247,128 | B2* | 2/2022 | Wu | G06N 5/01 |
| 11,291,915 | B1* | 4/2022 | Dicken | A63F 13/67 |
| 11,291,917 | B2* | 4/2022 | Beltran | G06N 20/00 |
| 11,291,919 | B2* | 4/2022 | Ma | G06N 5/04 |
| 11,318,386 | B2* | 5/2022 | Dicken | A63F 13/79 |
| 11,325,048 | B2* | 5/2022 | Yannakakis | G06N 3/045 |
| 11,331,581 | B2* | 5/2022 | Pedersen | G06N 20/10 |
| 11,348,031 | B2* | 5/2022 | Watson | G06N 3/006 |
| 11,351,458 | B2* | 6/2022 | Zhou | A63F 13/55 |
| 11,383,167 | B2* | 7/2022 | Osman | A63F 13/5375 |
| 11,394,755 | B1* | 7/2022 | Neerju | H04L 65/1086 |
| 11,417,171 | B2* | 8/2022 | Idris | G07F 17/3244 |
| 11,420,115 | B2* | 8/2022 | Dicken | A63F 13/792 |
| 11,465,052 | B2* | 10/2022 | Dicken | A63F 13/35 |
| 11,596,867 | B2* | 3/2023 | Snodgrass | A63F 13/56 |
| 11,623,138 | B2* | 4/2023 | Yeh | A63F 13/213 463/31 |
| 11,631,299 | B2* | 4/2023 | Shigeta | G07D 5/00 463/25 |
| 11,638,874 | B2* | 5/2023 | Lutz | A63F 13/57 463/31 |
| 11,724,194 | B2* | 8/2023 | Yang | G06F 18/10 463/1 |
| 2003/0109305 | A1* | 6/2003 | Gavin | A63F 13/5375 463/31 |
| 2005/0192098 | A1* | 9/2005 | Guo | A63F 13/30 463/42 |
| 2005/0246638 | A1* | 11/2005 | Whitten | A63F 13/10 715/708 |
| 2006/0143675 | A1* | 6/2006 | Willis | A63F 13/30 725/144 |
| 2006/0246972 | A1* | 11/2006 | Thomas | A63F 13/00 463/4 |
| 2006/0259623 | A1* | 11/2006 | Crawford | H04L 67/59 709/226 |

(56) References Cited

U.S. PATENT DOCUMENTS

| | | | |
|---|---|---|---|
| 2007/0112706 A1* | 5/2007 | Herbrich | G07F 17/3274 706/21 |
| 2007/0149288 A1* | 6/2007 | Nickell | G07F 17/3206 463/42 |
| 2007/0233849 A1* | 10/2007 | Chandranmenon | A63F 13/795 709/224 |
| 2007/0259707 A1* | 11/2007 | Kang | G07F 17/3237 463/16 |
| 2008/0182663 A1* | 7/2008 | Cheung | A63F 13/332 463/41 |
| 2008/0220854 A1* | 9/2008 | Midgley | A63F 13/35 463/25 |
| 2008/0268943 A1* | 10/2008 | Jacob | A63F 13/10 463/43 |
| 2009/0094535 A1* | 4/2009 | Bromenshenkel | A63F 13/67 715/757 |
| 2010/0321378 A1* | 12/2010 | Betzler | A63F 13/355 345/419 |
| 2012/0015744 A1* | 1/2012 | Mooney | A63F 13/822 463/42 |
| 2012/0015746 A1* | 1/2012 | Mooney | A63F 13/795 463/42 |
| 2012/0021840 A1* | 1/2012 | Johnson | A63F 13/60 463/43 |
| 2013/0316836 A1* | 11/2013 | Vogel | G06F 17/40 463/43 |
| 2014/0018143 A1* | 1/2014 | Yarbrough | G07F 17/3262 463/19 |
| 2014/0080560 A1* | 3/2014 | Knutsson | A63F 13/35 463/10 |
| 2016/0166935 A1* | 6/2016 | Condrey | A63F 13/48 463/31 |
| 2018/0001205 A1* | 1/2018 | Osman | A63F 13/67 |
| 2018/0001206 A1* | 1/2018 | Osman | A63F 13/798 |
| 2019/0168122 A1* | 6/2019 | Osman | A63F 13/335 |
| 2020/0341538 A1* | 10/2020 | Zhu | G06T 17/10 |
| 2021/0106918 A1* | 4/2021 | Osman | A63F 13/45 |
| 2021/0106919 A1* | 4/2021 | Osman | A63F 13/798 |
| 2021/0129019 A1* | 5/2021 | Colenbrander | A63F 13/335 |

* cited by examiner

GENERATION OF AN ARTIFICIAL INTELLIGENCE (AI) MODEL FOR AUTOMATIC CONTROL OF CHARACTERS DURING GAME PLAYS OF GAMING APPLICATIONS

CROSS REFERENCE TO RELATED APPLICATIONS

The present application is a continuation of and claims priority to and the benefit of U.S. application Ser. No. 17/112,513 filed on Dec. 4, 2020, entitled "AUTOMATED ARTIFICIAL INTELLIGENCE (AI) CONTROL MODE FOR PLAYING SPECIFIC TASKS DURING GAMING APPLICATIONS"; which is a continuation of and claims priority to and the benefit of U.S. application Ser. No. 15/426,581 filed on Feb. 7, 2017, entitled "AUTOMATED ARTIFICIAL INTELLIGENCE (AI) CONTROL MODE FOR PLAYING SPECIFIC TASKS DURING GAMING APPLICATIONS"; which claims priority to and the benefit of the commonly owned, provisional patent application, U.S. Ser. No. 62/357,290, entitled "AUTOMATED ARTIFICIAL INTELLIGENCE (AI) CONTROL MODE FOR PLAYING SPECIFIC TASKS DURING GAMING APPLICATIONS," with filing date of Jun. 30, 2016, all of which are herein incorporated by reference in their entireties.

This application is related to commonly assigned, co-pending U.S. patent application Ser. No. 15/085,899, entitled "PERSONALIZED DATA DRIVEN GAME TRAINING SYSTEM," filed on Mar. 30, 2016, the disclosure of which is hereby incorporated by reference in its entirety.

TECHNICAL FIELD

The present disclosure is related to video games. Among other things, this disclosure describes methods and systems for monitoring game play of users playing a plurality of gaming applications to generate game play profiles for the users, wherein a user game play profile simulates game play of the corresponding user, and for providing gaming control to a corresponding user playing a gaming application by controlling an instance of the gaming application based on the user game play profile.

SUMMARY

Embodiments of the present disclosure relate to systems and method for providing gaming control to a user playing a gaming application. The artificial intelligence (AI) character is allowed to play specific parts of the gaming application for the user. For example, the AI character can proceed in automatic mode to complete specific game tasks that are difficult for the user.

In one embodiment, a method for providing automatic game play control is disclosed. The method includes assigning a default game play profile to a user, wherein the default game play profile includes a default game play style that simulates human game play. The default game play profile is configured to control game play for the user based on the default game play style. The method includes monitoring a plurality of game plays of the user playing a plurality of gaming applications. The method includes generating a user game play profile of the user by adjusting the default game play style based on the plurality of game plays that is monitored, wherein the user game play profile comprises a user game play style that is customized to the user. The method includes controlling an instance of a first gaming application based on the user game play style of the user game play profile.

In another embodiment, a method for providing automatic game play control is disclosed. The method includes generating a user game play profile of a user, wherein the user game play profile defines a user game play style that simulates the game play of the user. The method includes receiving a request to stand-in for the user playing a first gaming application. The method includes controlling an instance of the first gaming application based on the user gamy play style of the user game play profile.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
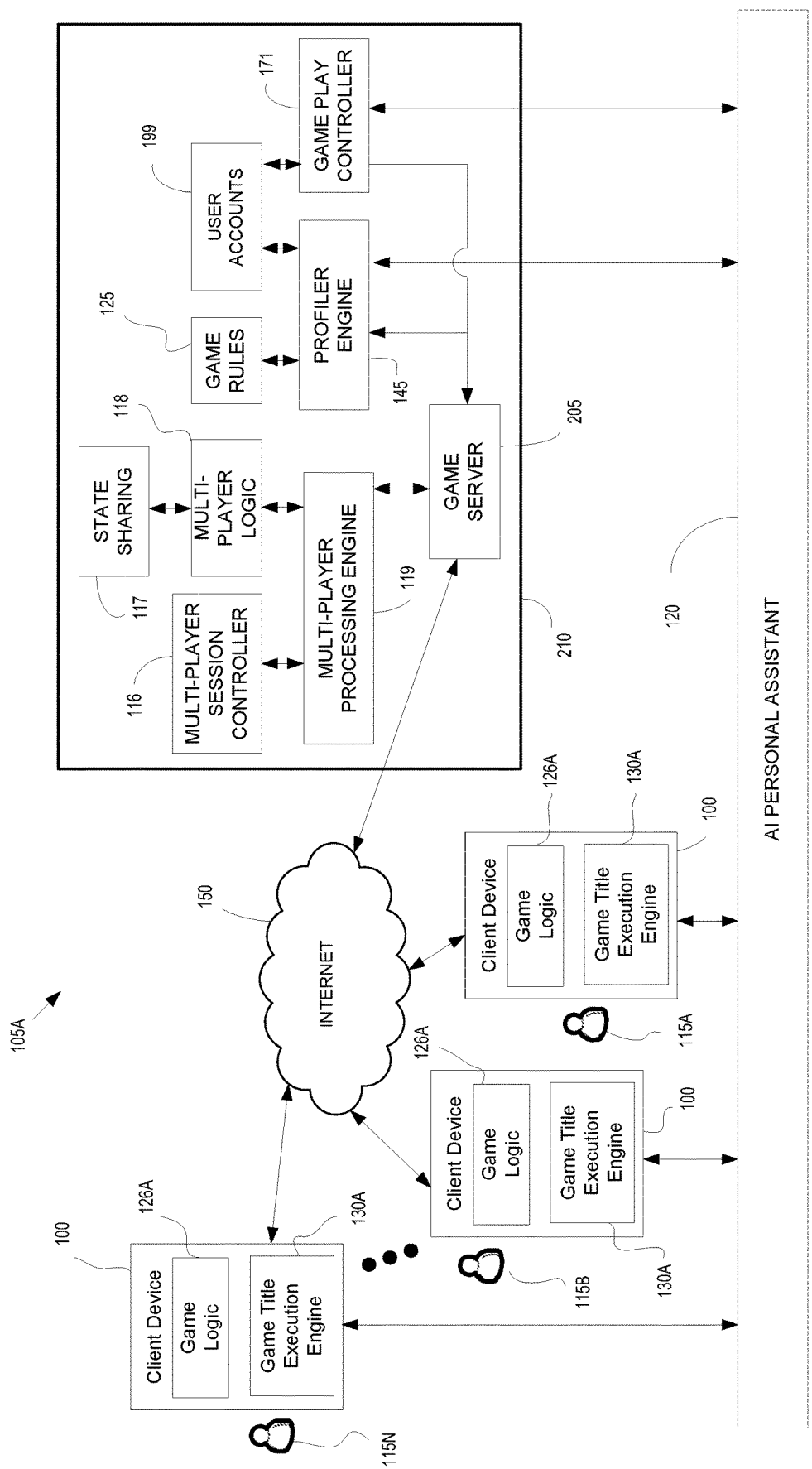
FIG. 1A illustrates a system providing gaming control to a user playing a gaming application that is executed locally, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing gaming control to a user playing a gaming application in a single-player mode or a multi-player mode. In particular, the game play controller is configured to play specific parts of the game for the user. For example, the game play controller can proceed in automatic mode to complete specific game tasks that are difficult for the user. If the AI character has completed specific tasks, those tasks can be identified as being completed by the user with assistance from the AI game controller. In still another embodiment, the game play controller is configured to play the gaming application after the user pauses the game play, such that an AI character is turned on to perform specific tasks. When the user wishes to return to active play, the user can stop the AI character, and allow the user to continue the game. In that manner, the game play of the user continues without user attention. The AI controlled character controlled by the game play controller will have different characteristics based on what is happening in the gaming environment, and as the gaming environment changes organically. As such, in a competitive multi-player game the user can allow the game play controller to take over game play of the user, so that the user is able to break away from the game (e.g., to eat, work, etc.). The game play controller trains an AI character to simulate the game play of the user (e.g., playing style), so that their online presence is maintained in the multi-player gaming session, and so that progress can continue in the gaming application. Further, the game play controller is able to play the game for the user to complete difficult tasks. For example, when the user is stuck (e.g., how to open the green door?) the user is able to query the gaming system for help. The gaming system transcribes or converts the query into text or video form, such as an annotated video clip. The annotated video clip is sent to all expert players who can answer the query. For example, a voice or text answer may return the solution: "You need the gold key." In addition, all the responses from the experts are collected (e.g., transcribed to text or converted to video), and the most common answer can be delivered back to the stuck player. The responses are also stored in a Game Knowledge database (e.g., Game Faqs), so they can be later accessed.

Accordingly, embodiments of the present disclosure provide for a better gaming experience for users participating in a gaming application because instead of struggling through hard sections of the gaming application, or quitting the gaming application, a game play controller is configured to control the game play of the user through those hard sections, wherein the user is able to resume control of his or her game play at any point. Also, other embodiments provide the above accomplishments and further provide for more efficient development of gaming applications through the use of analytics collected from game plays of users participating in a gaming application. The feedback provided to the game developers identify where users lose interest in a gaming application (e.g., through difficulty, boredom, etc.), which can be used by the developers to create new gaming applications that avoid those problems.

Throughout the specification, the term gaming application describes applications that allow interaction with a user. In one implementation, the gaming application includes a video game. Embodiments of the present disclosure provide gaming assistance to users participating in gaming applications. Other embodiments of the present disclosure provide assistance to users interacting with any type of application, such as word processing, computer aided design, etc.

Throughout the specification, the term user and player can be used interchangeably, and are meant to describe a person participating in a gaming application, or any other type of application. In some cases, embodiments of the present disclosure are described within the context of a "user" playing a gaming application within a game cloud system 210 and one or more "players" that are separately playing one or more gaming applications also within the game cloud system 210, wherein the user may or may not interact with the other players (e.g., single-player mode or multi-player mode).

With the above general understanding of the various embodiments, example details of the embodiments will now be described with reference to the various drawings.

FIG. 1A illustrates a system 105A providing gaming control to users playing a gaming application that is executed locally to the corresponding user, and wherein back-end server support (e.g., accessible through game server 205) may provide for analysis of game play data of the user for purposes of building a game play profile that simulates game play of the user, such that automatic control of the game play of a gaming application is enabled for a corresponding user playing a gaming application, in accordance with one embodiment of the present disclosure.

As shown in FIG. 1A, a plurality of users 115 (e.g., user 115A, user 115B . . . user 115N) is playing a plurality of gaming applications, wherein each of the gaming applications is executed locally on a corresponding client device 100 (e.g., game console) of a corresponding user. Each of the client devices 100 may be configured similarly in that local execution of a corresponding gaming application is performed. For example, user 115A may be playing a first gaming application on a corresponding client device 100, wherein an instance of the first gaming application is executed by a corresponding game title execution engine 130A. Game logic 117A (e.g., executable code) implementing the first gaming application is stored on the corresponding client device 100, and is used to execute the first gaming application. For purposes of illustration, game logic 117A may be delivered to the corresponding client device 100 through a portable medium (e.g., flash drive, compact disk, etc.) or through a network (e.g., downloaded through the internet 150 from a gaming provider). In addition, user 115B is playing a second gaming application on a corresponding client device 100, wherein an instance of the second gaming application is executed by a corresponding game title execution engine 130A. The second gaming application may be identical to the first gaming application executing for user 115A or a different gaming application. Game logic 117B (e.g., executable code) implementing the second gaming application is stored on the corresponding client device 100 as previously described, and is used to execute the second gaming application. Further, user 115N is playing an Nth gaming application on a corresponding client device 100, wherein an instance of the Nth gaming application is executed by a corresponding game title execution engine 130A. The Nth gaming application may be identical to the first or second gaming application, or may be a completely different gaming application. Game logic 117C (e.g., executable code) implementing the third gaming application is stored on the corresponding client device 100 as previously described, and is used to execute the Nth gaming application.

For purposes of clarity and illustration, embodiments of the present disclosure may be described with reference to user 115A, wherein user 115A is representative of any of the plurality of users 115.

Client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other type of computing devices that can interact with the game server 205 to provide back end functionality, such as gaming control or multi-player session management, etc.

Client device 100 of a corresponding user is configured for generating rendered images executed by the game title execution engine 130A executing locally or remotely, and for displaying the rendered images on a display. For example, the rendered images may be associated with an instance of the first gaming application executing on client device 100 of user 115A. For example, a corresponding client device 100 is configured to interact with an instance of a corresponding gaming application as executed locally or remotely to implement a game play of a corresponding user, such as through input commands that are used to drive game play.

In one embodiment, client device 100 is operating in a single-player mode for a corresponding user that is playing a gaming application. Back-end server support via the game server 205 may provide gaming control (e.g., automated game play control) for the user, such as through the game play controller 171, as will be described more fully below.

In another embodiment, multiple client devices 100 are operating in a multi-player mode for corresponding users that are each playing a specific gaming application. In that case, back-end server support via the game server may provide multi-player functionality, such as through the multi-player processing engine 119. In particular, multi-player processing engine 119 is configured for controlling a multi-player gaming session for a particular gaming application. For example, multi-player processing engine 130 communicates with the multi-player session controller 116, which is configured to establish and maintain communication sessions with each of the users and/or players participating in the multi-player gaming session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1C and FIG. 2, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 115A when playing the game, game level, character attributes, character location, number of lives left, the total possible number of lives available, armor, trophy, time counter values, etc. User saved data may also include user profile data that identifies a corresponding user 115A, for example. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may provide gaming control functionality, such as through the profiler engine 145, AI personal assistant 120, and game play controller 171. In particular, profiler engine 145 in the game cloud system 210 is configured to build a game play profile for the user that is able to simulate the game play of the user in one or more gaming applications. That is, the game play profile defines the game play style of the user. The game play profile is stored in an account associated with the corresponding user in the user accounts database 199. The game play controller 171 is able to access the game play profile and in conjunction with the AI personal assistant 120 control game play for the user in a particular gaming application, wherein the user may be playing in single-player mode or multi-player mode.

In general, artificial intelligence (AI) personal assistant 120 works in conjunction with game play controller 171 to provide gaming assistance to one or more users. AI personal assistant 120 is localized to a corresponding user as it provides the interface to the user for purposes of requesting and/or receiving personal assistance. For example in one embodiment, assistance in the form of game play control is provided to a single player playing a gaming application in a single-player mode when the user requests assistance. A system query for assistance may be triggered when it is determined that the user is playing inefficiently and/or struggling in his or her game play. Also, assistance in the form of game play control may also be provided to a single player that is playing in a multi-player gaming session when requested, for example when it is determined that the player is in need of assistance, or when the user requires a break.

In particular, AI personal assistant 120 is configured to work closely with a client device 100 of a corresponding user 115A to collect data regarding current and past game play of the corresponding user 115A. Further, AI personal assistant 120 is configured to provide an interface with the corresponding user 115, such that assistance can be enabled.

For example, a sequence of input commands may be provided through the interface as generated by the game play controller 171, wherein the input commands automatically control the game play of the user as currently executed by an instance of a corresponding gaming application. In one embodiment, AI personal assistant 120 may be configured locally within client device 100 of a corresponding user 115A, in one embodiment. In another embodiment, AI personal assistant 120 may be configured remote to client device 100, and independent of the game cloud system 210. For example, AI personal assistant 120 may be accessed through network 150 (e.g., local area network, internet, etc.). In still another embodiment, AI personal assistant 120 may be configured remote to client 100 within the game cloud system 210. In that case, personal assistant 120 may be directly coupled with the profiler engine 145 within game cloud system 210.

As shown, profiler engine 145 is configured to provide back-end server processing for purposes of building default game profiles that are applicable to one or more users, and to customize the default game profiles to each user for purposes of providing automated control of game play. In particular, through the game cloud system 210, profiler engine 145 is able to collect and analyze game plays of a plurality of users playing a plurality of gaming applications, especially when the game cloud system 210 is executing instances of one or more gaming applications for the plurality of users 115. For example, profiler engine 145 is able to collect and analyze user data when a corresponding user 115A is playing any gaming application. Over time, profiler engine 145 is able to learn the playing styles of the plurality of users 115, and build one or more default game profiles, each of which simulate human game play for a type of user. In particular, a default game play profile defines a default game play style that simulates human game play for a typical user. For example, one style may be mechanical, whereas another style may be more strategic. The default game play profile is configured to control game play for any user based on the selected or assigned default game play style.

In addition, profiler engine 145 is able to learn the playing style of a corresponding user 115A generally and/or for a particular genre of gaming applications and build a profile that defines that playing style. Initially, a default game play profile is assigned to the user, and may be used to control game play for that user based on the default game play style. Over time, a plurality of game plays of the user playing one or more gaming applications is monitored, and the profiler engine is able to learn the playing style of the user, and modify the default game play style to closely match the playing style of the user. In particular, a user game play profile of the user is generated by adjusting the default game play style based on the monitored plurality of game plays of the user. The user game play profile defines a user game play style that is custom and/or customized to the user.

For illustration, the game play style may include a mechanical game play style, and a strategic game play style. For example, the mechanical game play includes how the user mechanically manipulates controller functionality to direct game play. In general, the user may play very quickly especially if the user is an expert at gaming, or may play at a more leisurely pace especially if the user is a casual gamer. This may reflect habits of the user when playing gaming applications in general, or when playing a specific genre of gaming applications, or may reflect how the user plays a specific gaming application. The mechanical game play style may be unique to each user. For example, one user may have difficulty using a particular finger, or has lost that finger, which translates into a specific mechanical style (e.g., slower control or movement of a particular control button).

Furthermore, the strategic game play style reflects generally how the user plays a gaming application, or a genre of gaming applications, or a particular gaming application. For example, when presented with several goals to accomplish in order to reach the next level in a gaming application, one user may methodically proceed from one goal to the next in linear fashion. On the other hand, another user may randomly hop between goals while playing the gaming application in an effort to learn as much about each goal as quickly as possible. That user may then strategically decide to reorder how the goals are accomplished, or may continue work on one or more goals simultaneously. The strategic game play style may also be unique to the user 115A.

Further, the game play controller 171 is able to control game play of the user 115A based on the corresponding user game play profile. That is, game play controller 171 is configured to control an instance of a first gaming application based on the user game play style as defined in the user game play profile. In particular, game play controller 171 is able to control the game play in order to reach a desirable result as requested and defined by the user, such as accomplishing a task, progressing through a difficult section of the gaming application, or maintaining status quo. Game play controller 171 is able to access game data that defines how to control the game play to achieve the result. For example, profiler engine 145 is configured to collect data from game plays of multiple users playing the particular gaming application, and specifically addressing a task (e.g., difficult task) that may be perplexing to the user. Specifically, as more data is collected from game plays of multiple users, the profiler engine 145 is able to learn (e.g., by applying deep learning or artificial intelligence techniques) how a particular gaming application should be played (generally, or within the context of a given level, sub-level, or given problem), or is being played by successful users, and/or other unsuccessful users (e.g., learning from mistakes). The way a gaming application should be played as learned by the profiler engine 145 will evolve over time, as more data is collected on game plays of users playing that gaming application. In that manner, control of game play is enabled to achieve a desirable result.

Figure 1B:
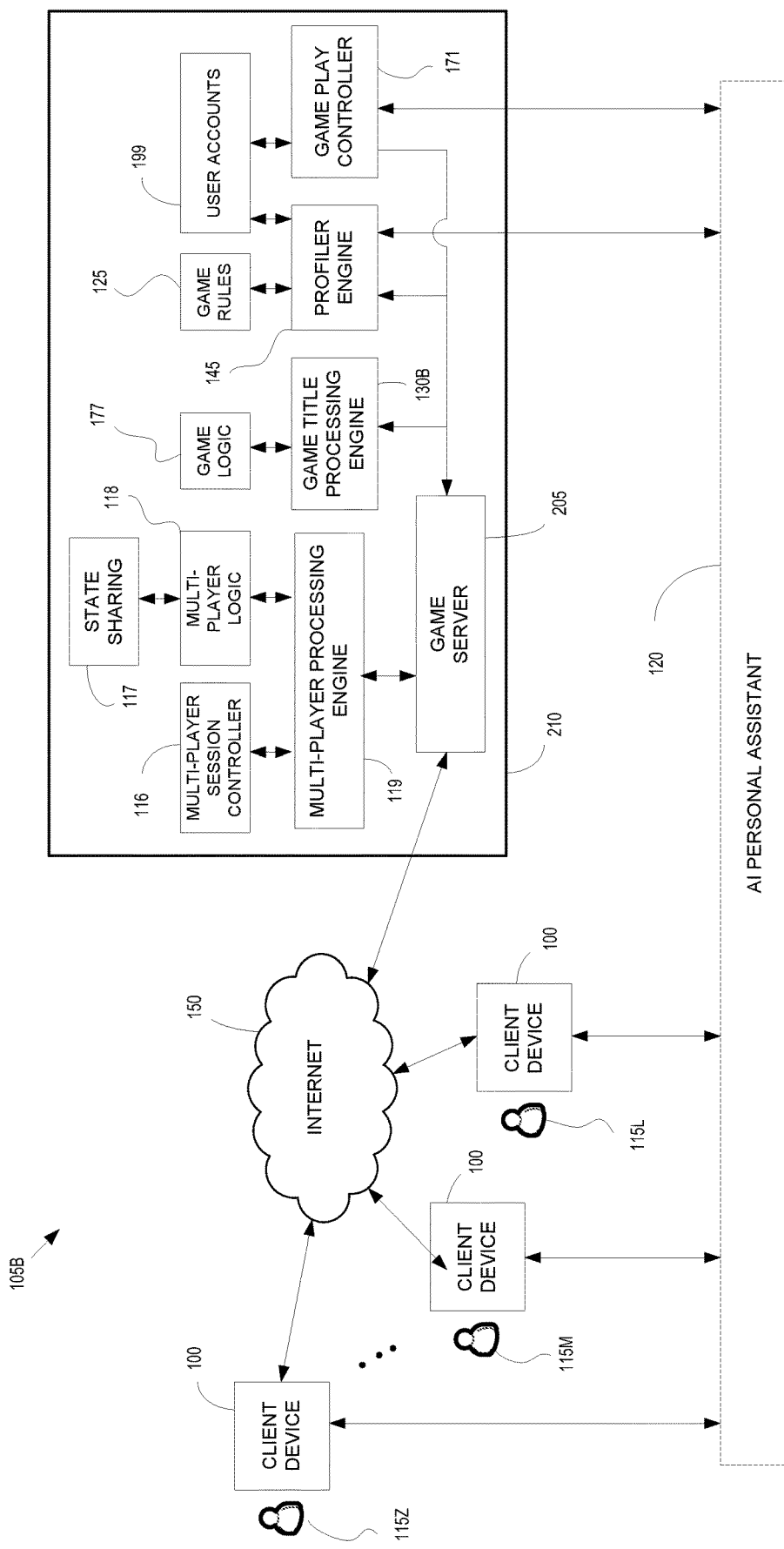
FIG. 1B illustrates a system providing gaming control to a user playing a gaming application as executed over a cloud game network, in accordance with one embodiment of the disclosure.

FIG. 1B illustrates a system providing gaming control to a user 115A playing a gaming application as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user 115A. As such, a plurality of game processors of game server 205 associated with a plurality of virtual machines is configured to execute multiple instances of the gaming application associated with game plays of the plurality of users 115. In that manner, back-end server support provides streaming of media (e.g., video, audio, etc.) of game plays of a plurality of gaming applications to a plurality of corresponding users.

A plurality of users 115 accesses the game cloud system 210 via network 150, wherein users 115 access network 150 via corresponding client devices 100. For example, a client device 100 of a corresponding user 115A is configured for requesting access to gaming applications over a network 150, such as the internet, and for rendering instances of gaming application (e.g., video game) executed by the game server 205 and delivered to a display device associated with the corresponding user 115A. For example, user 115A may be interacting through client device 100 with an instance of a gaming application executing on game processor of game server 205. More particularly, an instance of the gaming application is executed by the game title execution engine 130B. Game logic (e.g., executable code) implementing the gaming application is stored and accessible through data store 140, and is used to execute the gaming application. Game title processing engine 130B is able to support a plurality of gaming applications using a plurality of game logics 177, as shown.

The client device 100 may receive input from various types of input devices, such as game controllers, tablet computers, keyboards, gestures captured by video cameras, mice, touch pads, etc. As previously described, client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a gaming application.

Client device 100 of a user 115A is configured for receiving rendered images delivered by the game server 205, and for displaying the rendered images on a display. For example, the rendered images may be associated with an instance of a gaming application executing on game server 205 in association with a corresponding user 115A. In particular, a client device 100 is configured to interact with the instance of the gaming application associated with game play of user 115A, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user 115A at a particular point, as previously described. Further, state data may include user saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

Also, game server 205 may provide gaming control functionality, such as through profiler engine 145, AI personal assistant 120, and game play controller 171. For instance, profiler engine 145 in the game cloud system 210 is configured to build a game play profile for a corresponding user, wherein the game play profile is configured to simulate the game play of the user across one or more gaming applications. In particular, the game play profile defines the game play style of the user, and is stored in an account in the user accounts database 199. As such, the game play controller 171 is able to access the game play profile, and possibly via the AI personal assistant 120 in one embodiment or directly in another embodiment, control game play for the user playing a particular gaming application either in single-player or multi-player mode.

In one embodiment, AI personal assistant 120 works in conjunction with game play controller 171 to provide gaming control to a corresponding user 115A. As previously described, AI personal assistant 120 provides the interface for purposes of requesting and/or receiving assistance for implementing game play control, and may be executing local to the client device of the user or remote from the client device. For example, in one embodiment, game play control is provided to a user 115A requesting the functionality. The user 115A may decide to take a break from playing, but still wants to progress through the game, or may want to maintain a presence in a gaming environment (e.g., in a multi-player gaming session) without jeopardizing game progress or loss of participation, or may want assistance in progressing past a difficult section of the gaming application.

In particular, AI personal assistant 120 is configured to work closely with a client device 100 of a corresponding user 115A to collect data regarding current and past game play of a corresponding user 115A. Further, AI personal assistant 120 is configured to provide an interface with the corresponding user 115A, such that assistance can be provided. For example, in one embodiment gaming control input commands as generated by the game play controller 171 may be provided through the interface if the gaming application is executed locally. In another embodiment, the input commands may flow through the client device 100 or be sent directly to the game title processing engine when the gaming application is executed at the back end server. In still another embodiment, AI personal assistant 120 may be configured locally within client device 100 of a corresponding user 115. Also, localized AI personal assistant 120 may be configured remote to client device 100 independent of the game cloud system 210, in another embodiment. For example, AI personal assistant 120 may be accessed through network 150 (e.g., local area network, internet, etc.). In still another embodiment, localized AI personal assistant 120 may be configured remote to client 100 within the game cloud system 210. In that case, personal assistant 120 may be directly coupled with the profiler engine 145 within game cloud system 210.

As shown, profiler engine 145 is able to collect and analyze game plays of a plurality of users 115 playing a plurality of gaming applications, especially when the game cloud system 210 is executing instances of the gaming applications for the users 115. As such, one or more default game profiles may be built each of which define a default game play style. A default game play profile is able to simulate human game play for a type of user exhibiting the default game play style. The default game play profile is configured to control game play for any user.

In addition, profiler engine 145 is able to collect and analyze user data when a corresponding user 115A is playing any gaming application. Over time, profiler engine 145 is able to learn the playing style of the corresponding user 115A generally, for a particular genre of gaming applications, or for a particular gaming application. As previously described, a default game play profile is customized to the corresponding user 115A based on a plurality of game plays of the user 115A that is monitored. That is, the profiler engine 145 is able to learn the playing style of the user 115A, and modify the default game play style to closely match the playing style of the user 115A. As such, the user game play profile defines a user game play style for the corresponding user 115A.

Further, the game play controller 171 is able to control game play of the user 115A based on the corresponding user game play profile. In particular, game play controller 171 is configured to control an instance of a corresponding gaming application based on the user game play style as defined in the user game play profile. For example, game play controller 171 is able to control the game play to achieve a desirable result as requested and defined by the user 115A, as previously described. The result or goal may be to progress through the gaming application, or to maintain the status quo (e.g., keep character alive) of the progress through the gaming application while the user takes a break without jeopardizing participation in the gaming application (e.g., a multi-player session), etc. Specifically, game play controller 171 is able to access game data that defines how to control the game play to achieve the result, as previously described. As such, to complete a particular task, the game data provides the necessary input commands to achieve the task, as learned through one or more game plays of other users that successfully completed that task. In that manner, control of game play is enabled to achieve a desirable result.

Figure 1C:
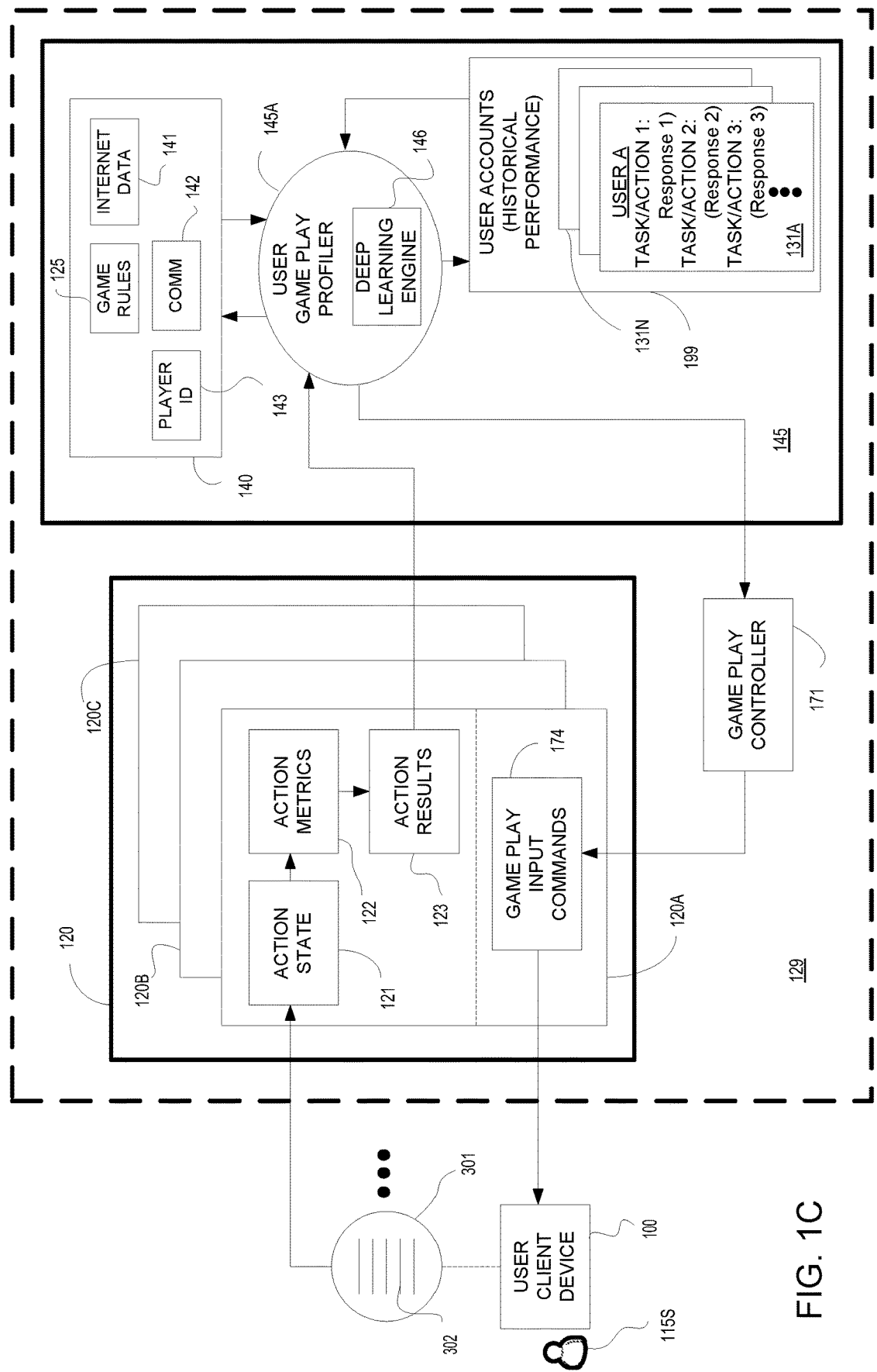
FIG. 1C illustrates an automated artificial intelligence (AI) game play controller system, in accordance with one embodiment of the disclosure.

FIG. 1C illustrates an automated artificial intelligence (AI) personal assistance system 129 that includes the profiler engine 145, AI personal assistant 120, and game play controller of FIGS. TA-B, in accordance with one embodiment of the present disclosure. AI personal assistant system 129 is configured to provide gaming control to a user playing a gaming application in single-player mode or multi-player mode based on the game play profile of the corresponding user.

As shown, the AI personal assistant 120 and the game play controller 171 of system 129 work together to provide game play control, and may be located together, or remotely from each other, as previously described. In one embodiment, each user is supported by a separate AI personal assistant system 129, which includes at least a dedicated AI personal assistant 120 that is supported by a back end profiler engine 145 and game play controller 171, in combination. For example, as shown in FIG. 1C, user 115S is supported by AI personal assistant 120A that is in communication with the user game play profiler 145A of profiler engine 145 and game play controller 171. Similarly, another user is supported by AI personal assistant 120B that is in communication with the user game play profiler 145A of profiler engine 145 and game play controller 171. Still another user is supported by AI personal assistant 120C that is in communication with the user game play profiler 145A of profiler engine 145 and game play controller 171. Still other users are supported similarly.

AI personal assistant system 129 is configured for monitoring game play of a user 115S playing a gaming application. In one embodiment, game play is monitored to help build a game play profile customized for the user 115S. In particular, the AI personal assistant 120 is configured for monitoring game play of the user 115S and collecting user data that can be used for artificial intelligence (AI) purposes. For example, in a game play, the user 115S may have a defined task 301 to accomplish. The task may include a single action or sub-task 302, or multiple actions or sub-tasks, as indicated by the hash marks 302 within task 301. Also, the task may include no actions or sub-tasks. Further, the task is defined by a task type, such that similar tasks may be grouped under a single task type. These tasks may have similar goals, perform similar actions or sub-tasks to complete the task, or share other similarities. By grouping tasks under a task type, game plays of users addressing tasks of the task type may be analyzed to learn appropriate actions to take, the actions to avoid, the best styles of game plays, and the most efficient styles of game play for successfully completing those tasks for a particular gaming application, for a genre of gaming applications, or for gaming applications in general.

In another embodiment, the game plays of the user 115S are monitored by AI personal assistant 120. That is, a plurality of game plays of the user 115S playing a plurality of gaming applications is monitored. The game plays include a plurality of tasks to address and/or accomplish. Each of the tasks monitored is defined by a corresponding task type. In that manner, tasks of the same type can be analyzed to determine the gaming style, gaming habits, and proficiency of the user. That information is helpful in building a game play profile for that user 115S, wherein the game play profile simulates the game play of the user 115S when encountering a task of a particular task type.

In particular, a plurality of responses by a plurality of users 115 is monitored throughout a plurality of game plays. The responses may be to one or more tasks of one or more task types. For tasks of a first type, the responses are analyzed to determine a default first response. The default game play style includes the default first response that defines actions to take when a corresponding user 115S is presented with a task of the first task type. Further, a user first response that is associated with a corresponding user 115S is generated by adjusting the default first response based on a plurality of first responses taken by the corresponding user 115S to tasks of the first type in a plurality of game plays. In one embodiment, a least squares function is applied to each of the first responses associated with the user to generate the user first response. In that manner, when the corresponding user 115S is presented with a task of the first type, the game play controller 171 is able to play an appropriate response based on the user first response in the user game play profile.

The AI personal assistant 120 for a corresponding user 115S is able to monitor the game play of the user. For instance, for every response taken by the user 115S of client device 100 to address a task or subtask or action, the action state 121, action metrics 122, and action results 123 are collected by AI personal assistant 120. Reponses may be defined generally and include strategic decisions made by the user (e.g., attack now vs. later, collect coins diligently or poorly, etc.), directions taken in the game play (e.g., traveling to city 1 vs city 2), choices made (equip with armor 1 or armor 2). Also, responses may be defined specific to a task, such as how a user addressed the actions or sub-tasks (e.g., in what order, success in completing the sub-tasks, etc.).

In particular, the action state 121 defines the action, sub-task, or task that is addressed within the context or gaming environment of the gaming application. The gaming environment will help determine what kind of action type describes the task. For example, certain actions may be classified differently depending on the gaming environment. The actions may be classified under a first type when the gaming environment is relaxed (e.g., general traversing from one location to another), but classified under a second type when the gaming environment is tense (e.g., battling the boss). Further, action metrics 122 are collected by the AI personal assistant 125. These metrics are associated with the responses taken by the user in addressing the task, sub-tasks, or actions. Also, action results 123 are collected by localized AI personal assistant 120A. For example, results 123 include whether the user 115S was successful in accomplishing the task, sub-task, or action. Also, results 123 may define how well (e.g., efficiency) the user 115S performed in addressing the task, sub-task, or action.

The collected data (e.g., action state 121, action metrics 122, and actions results 123) are delivered to profiler engine 145 for further analysis (e.g., generating a user response to tasks of certain type). Specifically, the collected data is delivered to the user game play profiler 145A that compares the collected data for the user 115S against the current and historical performance of the user 115S as well as historical performances of other users, when playing the gaming application, a genre of gaming applications, or gaming applications in general, and especially when addressing a task of a particular task type. In that manner, the user game play profiler 145A is able to build a game play profile for each user, wherein a user is identified by corresponding player ID 143, within the game cloud system 210, wherein the game play profile simulates human game play for a corresponding user when playing one or more gaming applications. For example, the game play profiles are based on corresponding user data, game rules 125 of one or more gaming applications of one or more gaming applications, wherein game rules 125 are stored in data store 140.

In one embodiment, a plurality of game plays of a plurality of players is monitored by one or more AI personal assistant systems 129. The game plays are associated with a plurality of gaming applications. The game plays include a plurality of tasks to address and/or accomplish, wherein each task is defined by a corresponding task type, as previously described. As such, the collected data can be used to build game play profiles for a plurality of users 115, as previously described. Also, the collected data can be used to build default game play profiles that can then be customized to a corresponding user, such as user 115S. Further, the collected data can be used to determine appropriate responses to take in order to successfully accomplish a goal, such as completing a task (e.g., beating a game or level boss).

In particular, gaming profiles 131A-N are created by the user game play profiler 145A of the profiler 145. For purposes of illustration, a gaming profile may include historical performance of a user 115A when addressing a plurality of tasks. Each of the tasks may also be associated with a defined response, wherein the response to the task may be generally applied to tasks of an associated task type, or may be applied specifically to that task. For example, the gaming profile 131A of user 115A shows a response 1 for task/sub-task/action 1, response 2 for task/sub-task/action 2, response 3 for task/sub-task/action 3, and so on. Similarly a gaming profile 131S may be built for user 115S.

The data in gaming profiles 131A-N may be fed back to the deep learning engine 146 of the user game play profiler 145. Deep learning engine 146 utilizes artificial intelligence, including deep learning algorithms, reinforcement learning, or other artificial intelligence-based algorithms. In that manner, the analysis on the collected data may be continually performed to provide updated analytics used for upgrading and/or building default game play profiles, and game play profiles for corresponding users. For example, a game play profile for a corresponding user may be updated to reflect new data. In one embodiment, successful responses to tasks as monitored from a plurality of game plays of a plurality of users is analyzed to determine the appropriate response to take in association with a particular task that is presented to the user.

The deep learning engine 146 of user game play profiler 145A is able to collect data 141 (e.g., internet data) over social networks to identify problems, game play difficulties, etc. within a gaming application. For example, users may post to a gaming blog asking questions on how to beat a particular section of a gaming application. The deep learning engine 146 can use that data to identify difficult tasks to build a database including various approaches to the tasks as played by multiple players, and their relative successes and/or failures when addressing those tasks. Also, the user game play profiler 145A of the game title processing engine 130 is configured to analyze communications 142 of a particular user, or communications between users for use in identifying problems, game play difficulties, etc. within a gaming application, as previously described.

Further, the game play controller 171 is configured to control an instance of a gaming application based on the user game play style of a corresponding user game play profile for a corresponding user 115S. In particular, when automated game play control is requested by the user 115S, detection of a first task that is presented to the user 115S is effected in order to determine an appropriate response. The first task is associated with a first task type. The first task that is presented and/or approached in the game play of the user 115S is automatically controlled based on a defined user first response, which is further defined for that first task, or for the first task type. Appropriate game play input commands 174 associated with the first response is delivered to the user client device 100 through the AI personal assistant 120, or directly to the appropriate game title processing engine 130B.

In one embodiment, AI personal assistant system 129 is able to detect one or more failed responses to a first task in the game play of a corresponding user 115S. A query is then generated asking if the user would like assistance, such as in the form of automated game play control. The query is delivered to the user client device through the AI personal assistant 120. In another embodiment, a request for help (e.g., to take control, or to accomplish a task) is received from the client device 100 of a corresponding user 115S. The request may be made in response to the query, in one embodiment. In another embodiment, the request is made independently of any query. The assistance when requested by the user 115S may come in the form of instructions to complete the task, hints to complete the task, or automated game play control, as previously described.

Figure 1D:
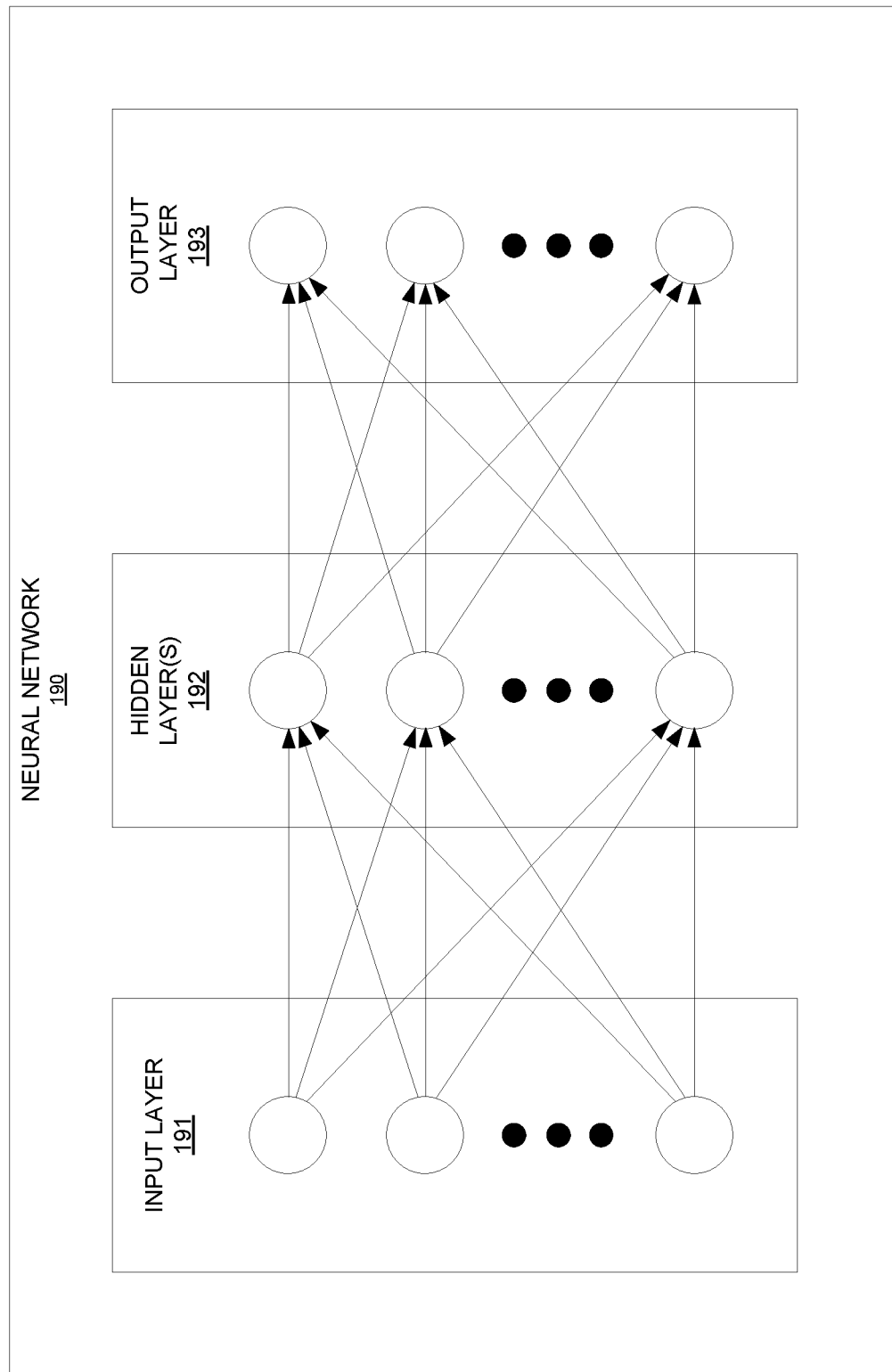
FIG. 1D illustrates an example neural network used to train a profiler engine, in accordance with one embodiment of the present disclosure.

FIG. 1D illustrates an example neural network 190 used to train the deep learning engine 146 in support of one or more modules of the AI personal assistance system 120, in accordance with one embodiment of the present disclosure.

For example, the neural network 190 represents an example of an automated analysis tool for analyzing data sets used by the user game play profiler 145A to determine game play profiles for the plurality of users 115. In particular, an instance of the neural network 190 may be used to train the user game play profiler 145A to determine the game play profile for the plurality of users 115 which can be used to control the game play of the user 115S, and/or to provide recommendations during game play of a particular user.

Different types of neural networks 190 are possible. In an example, the neural network 190 supports deep learning that may be implemented by deep learning engine 146. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. Each of these input nodes is mapped to a user game play profile feature (e.g., features specific to interactions of a user with a video game, to a user playing a video game, to a video game, etc.).

At the highest hierarchical level, an output layer 193 exists. The output layer 193 includes a set of output nodes. An output node represents a decision that relates to one or more components of a user game play profiler, for example. As previously described, the output nodes may identify problems, tasks, task types, difficult tasks, approaches to complete a specific task within a gaming application, other game play difficulties within a gaming application, predicting a rate of success for a user regarding a particular type of task or a particular task, predicting a rate of success for a team of members that are given a set of tasks to accomplish, determine a proficiency score for a user and/or team, determine a recommendation, provide assistance, provide appropriate responses to take regarding a presented task or task type according to a particular user's game play style, learn appropriate responses or approaches to take with respect to a particular task, etc. The nodes in the neural network 190 learn the parameters of the model that can be used to make such decisions.

A hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes. However, the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes.

An interconnection connects two nodes. The interconnection has a numerical weight that can be learned. (e.g., based on the user game play profiler, recommendation data set, etc.), rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters that minimize the cost function. An example of such an optimization method is stochastic gradient descent.

In an example, the training dataset for the neural network 190 is from a same data domain. For instance, the neural network 190 is trained for a specific gaming application. In this illustration, the data domain includes game session data collected for interactions of players with the video game. In another example, the training dataset is from different data domains. For instance, the neural network 190 is trained for a genre of gaming applications.

As such, the neural network 190 may define a predictive model that is used to predict or determine how a user should respond when presented with a particular task, or generally to tasks of a corresponding task type according to the game play style of the corresponding user. The neural network 190 may also define a predictive model that is used to predict, learn, or determine that appropriate responses to take in order to accomplish a particular task, such as a difficult task, based on game plays of users that have successfully completed that task. Based on these predictive results, assistance may be provided to a user, such as recommendations (e.g., hints), or control of the game play for the corresponding user.

Figure 2:
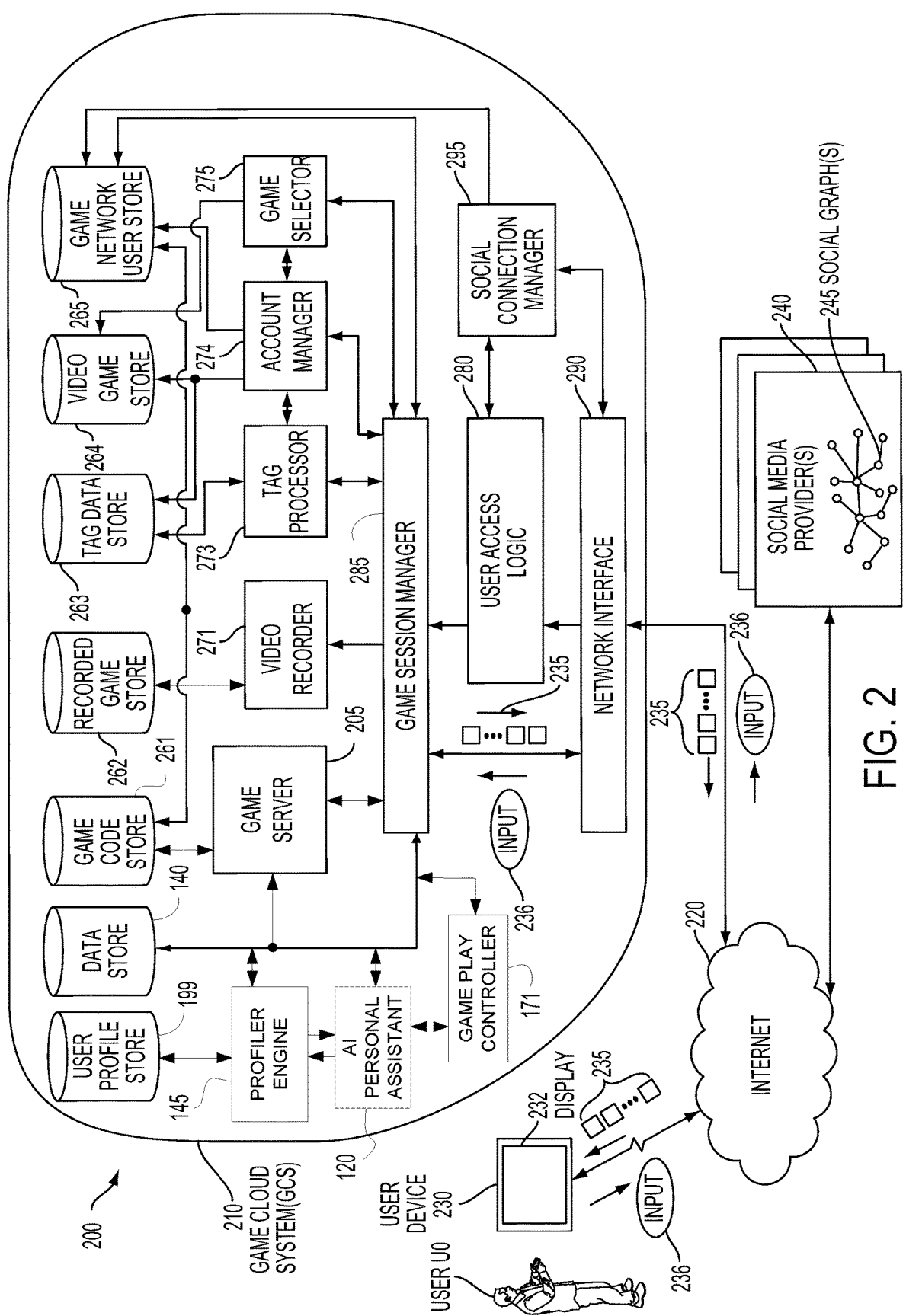
FIG. 2 illustrates a system diagram for providing gaming control to a user playing a gaming application as executed over a cloud game network, in accordance with one embodiment of the disclosure.

FIG. 2 illustrates a system diagram 200 for enabling access and playing of video games stored in a game cloud system (GCS) 210, in accordance with an embodiment of the disclosure. Generally speaking, game cloud system GCS 210 may be a cloud computing system operating over a network 220 to support a plurality of users. Additionally, GCS 210 is configured to provide assistance in the form of gaming control to a user playing a gaming application in a single-player mode or multi-player mode using the game title processing engine 130, AI personal assistant 120, and game play controller 171. In particular, system 200 includes GCS 210, one or more social media providers 240, and a user device 230, all of which are connected via a network 220 (e.g., internet). One or more user devices may be connected to network 220 to access services provided by GCS 210 and social media providers 240.

In one embodiment, game cloud system 210 includes a game server 205, a video recorder 271, a tag processor 273, and account manager 274 that includes a user profile manager, a game selection engine 275, a game session manager 285, user access logic 280, a network interface 290, and a social media manager 295. GCS 210 may further include a plurality of gaming storage systems, such as a user gaming profile store, game logic store, gaming application rules store, state sharing store, internet data store, game state store, random seed store, user saved data store, snapshot store, which may be stored generally in datastore 140. Other gaming storage systems may include a game code store 261, a recorded game store 262, a tag data store 263, video game data store 264, and a game network user store 265. In one embodiment, GCS 210 is a system that can provide gaming applications, services, gaming related digital content, and interconnectivity among systems, applications, users, and social networks. GCS 210 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

User $U_0$ is able to access services provided by GCS 210 via the game session manager 285, wherein user $U_0$ may be representative of user 115 of FIGS. 1A-C. For example, account manager 274 enables authentication and access by user $U_0$ to GCS 210. Account manager 274 stores information about member users. For instance, a user profile for each member user may be managed by account manager 274. The account manager 274 may be configured to manage the gaming profile for member users, in one implementation. For instance, member information can be used by the account manager 274 for authentication purposes. For example, account manager 274 may be used to update and manage user information related to a member user. Additionally, game titles owned by a member user may be managed by account manager 274. In that manner, video games stored in data store 264 are made available to any member user who owns those video games.

In one embodiment, a user, e.g., user $U_0$, can access the services provided by GCS 210 and social media providers 240 by way of user device 230 through connections over network 220. User device 230 can include any type of device having a processor and memory, wired or wireless, portable or not portable. In one embodiment, user device 230 can be in the form of a smartphone, a tablet computer, or hybrids that provide touch screen capability in a portable form factor. One exemplary device can include a portable phone device that runs an operating system and is provided with access to various applications (apps) that may be obtained over network 220, and executed on the local portable device (e.g., smartphone, tablet, laptop, desktop, etc.).

User device 230 includes a display 232 that acts as an interface for user $U_0$ to send input commands 236 and display data and/or information 235 received from GCS 210 and social media providers 240. Display 232 can be configured as a touch-screen, or a display typically provided by a flat-panel display, a cathode ray tube (CRT), or other device capable of rendering a display. Alternatively, the user device 230 can have its display 232 separate from the device, similar to a desktop computer or a laptop computer.

In one embodiment, user device 130 is configured to communicate with GCS 210 to enable user $U_0$ to play a video game or gaming application. For example, user $U_0$ may select (e.g., by game title, etc.) a video game that is available in the video game data store 264 via the game selection engine 275. In that manner, the selected video game is enabled and loaded for execution by game server 205 on the GCS 210. In one embodiment, game play is primarily executed in the GCS 210, such that user device 230 will receive a stream of game video frames 235 from GCS 210, and user input commands 236 for driving the game play is transmitted back to the GCS 210. The received video frames 235 from the streaming game play are shown in display 232 of user device 230.

In one embodiment, after user $U_0$ chooses an available game title to play, a game session for the chosen game title may be initiated by the user $U_0$ through game session manager 285. Game session manager 285 first accesses game state store in data store 140 to retrieve the saved game state of the last session played by the user $U_0$ (for the selected game), if any, so that the user $U_0$ can restart game play from a previous game play stop point. Once the resume or start point is identified, the game session manager 285 may inform game execution engine in game processor 210 to execute the game code of the chosen game title from game code store 261. After a game session is initiated, game session manager 285 may pass the game video frames 235 (i.e., streaming video data), via network interface 290 to a user device, e.g., user device 230. In another embodiment, game session manager 285 may provide multi-player session management independent of or in conjunction with the multiplayer session controller 121 of FIG. 1A.

During game play, game session manager 285 may communicate with game processor 210, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data stored 263.

Game session manager 285 may communicate with game processor 204 to deliver and obtain user input commands 236 that are used to influence the outcome of a corresponding game play of a video game. Input commands 236 entered by user $U_0$ may be transmitted from user device 230 to game session manager 285 of GCS 210. Input commands 236, including input commands used to drive game play, may include user interactive input, such as including tag content (e.g., texts, images, video recording clips, etc.). Game input commands as well as any user play metrics (how long the user plays the game, etc.) may be stored in game network user store 165. Select information related to game play for a video game may be used to enable multiple features that may be available to the user. For example, in embodiments data relating to the proficiency of a corresponding user in participating in a video game, or genre of gaming applications, or gaming applications in general may be collected and stored in game network user store 265. Because game plays are executed on GCS 210 by multiple users, gaming profiles may be generated for every user. In that manner, the game play of a user may be compared with game plays of multiple users to determine how well the user is playing the video game, and whether the user can benefit from recommendations provided by the game title processing engine 130 and localized AI personal assistant 120. Assistance to users (e.g., hints, tutorials, game play control, etc.) in a single-player mode or multi-player mode can enhance the experience of the users playing a gaming application or video game by facilitating efficient game play and by helping users proceed through harder and/or impossible sections of the gaming application. In the case of user $U_0$, user device provides an interface allowing user $U_0$ to receive communications from a back end server (e.g., game title processing engine 130 of GCS 210 providing gaming assistance during the game play of user $U_0$.

Further, profiler engine 145 is configured to collect data from a plurality of users playing a plurality of gaming applications to build one or more default game play profiles, and to build a personalized game play profile for a corresponding user. In that manner, the game play controller 171 is able to apply a user game play profile to simulate human game play for the corresponding user in a particular gaming session of a gaming application. The AI personal assistant 120 facilitates the collection of data, and game play control as implemented through a client device 100 of a corresponding user.

Figure 3A:
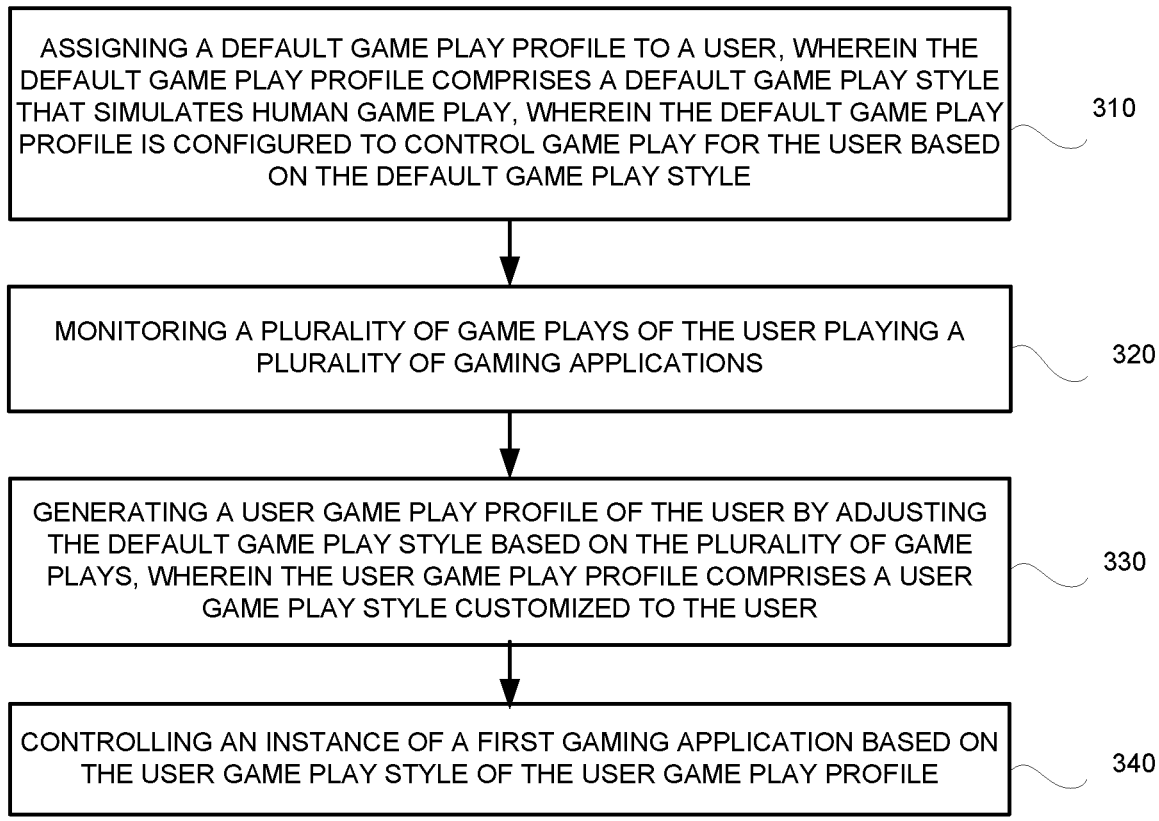
FIG. 3A is a flow diagram illustrating steps in a method for providing gaming control, in accordance with one embodiment of the disclosure.

With the detailed description of the various modules of the gaming server and client device communicating over a network, a method for providing gaming control is now described in relation to flow diagram 300A of FIG. 3A, in accordance with one embodiment of the present disclosure. Flow diagram 300A illustrates the process and data flow of operations involved at the AI personal assistant system 129 for purposes of providing game play control for a corresponding user participating in a gaming application. In particular, the game play controller is configured to implement at least some of the operations of flow diagram 300A.

For example, a game play controller is configured to play specific parts of the game for the user. For example, the game play controller can proceed in automatic mode to complete specific game tasks that are difficult for the user. Also, the game play controller is configured to play the gaming application in place of the user (e.g., as initiated through a pause in the game), such that an AI character is turned on to perform tasks that are currently presented. When the user wishes to return to active play, the user can stop the AI character, which allows the user to return to controlling his or her own character in the gaming application. In that manner, the game play of the user continues without user attention, and then resumes after automated game play control is terminated.

At 310, the method includes assigning a default game play profile to a user. The default game play profile defines a default game play style that simulates human game play for a type of user. The user type for a corresponding user may be selectable by the user, or be automatically assigned to the user based on information related to the user that may be actively or passively collected or determined through monitoring. The default game play profile is based on a plurality of game plays of a plurality of users as monitored by a game cloud system. In particular, the game play profile is configured to control game play for any user based on the default game play style. For example, game plays are monitored to identify tasks that are addressed, wherein each task is associated with a corresponding task type. Responses to tasks of a particular task type are collected, and then analyzed to determine a default response to apply when a user (e.g., user's character) is confronted with a task of that task type.

At 320, the method includes monitoring a plurality of game plays of the user playing a plurality of gaming applications. This monitoring allows for learning of a game play style of that user. In addition, the data collected may be combined with data from other users to determine a default game play style that is defined by a default game play profile. Further, the data collected may be used to learn how to approach a task, especially when the user is successful in accomplishing the task. This successful approach may be collected and connected to other successful approaches accomplished by other users to determine one or more approaches to take when presented with the task. These successful approaches may be presented as helpful hints or tutorials, and may be used during automatic game play control. Also, the data collected may be used to discover which sections are difficult, and which are too difficult for a majority of users. As such, the data may be used to help developers avoid using that type of task in future gaming applications.

At 330, the method includes generating a user game play profile of the user by adjusting the default game play style based on the plurality of game plays specific to the user, wherein the user game play profile defines and comprises a user game play style customized to the user. In particular, the user game play profile may be generated and/or updated to define how to respond to a particular task or a particular task type. For example, a plurality of first responses are monitored in a plurality of game plays of the user, wherein the responses are taken to address a plurality of tasks of a first task type. A user first response to tasks associated with a first task type is generated by adjusting the default first response in the default game play profile based on the plurality of first responses of the user. In one embodiment, the user first response is generated and/or updated by iteratively applying a least squares function to the plurality of first responses generated by the user. In that manner, the user first response simulates how the user would generally respond when confronted with a task of the first task type.

In one embodiment, the user game play profile may be updated according to game play of the user. For example, new game play data may be reflected in the game play profile. In particular, with regards to a task, a second plurality of first responses by the user to a second plurality of tasks is monitored, and used to adjust the user first response to tasks of the first task type. The second plurality of first responses may include the previously collected first responses, or may be an independent set of first responses.

In one embodiment, the method includes detecting that the user is in need of assistance. For example, failures of the user when addressing a particular task may be monitored. After a threshold amount of failed attempts, a query may be generated for display to the user asking if the user needs assistance (e.g., in the form of hints or game play control, etc.). A request for assistance may be received from the client device of the user. The request may be in response to the query, or may be generated in isolation of any query, such as when the user would like to initiate automated game play control for a period of time while the user is away. In some forms, the assistance comes in the form of a hint to successfully accomplish the task. In other forms, the assistance comes in the form of game play control.

At 340, the method includes controlling an instance of a first gaming application based on the user game play style of the user game play profile in a game play of the user executed by an instance of a gaming application. Control may be initiated upon request by the user. In particular, the method includes detecting that the user is presented with a first task, wherein the first task is of a first task type. The method approaches the first task based on the user first response defined in the user game play profile. For example, the user first response may provide specific input commands to implement, or may provide general strategic instructions on how to accomplish the task.

In one embodiment, the game play controller is configured to play the gaming application after the user makes a request for automated game play control. The game play by the user is paused initially during the automated game play control, such that that the user is not driving the game play, in one embodiment. The pause may occur before or after the user makes the request for automated game play control. An AI character may be turned on, or AI character functionality is turned on in order to specify how to control the one or more characters in the game play to simulate the user's game play, such as to perform specific tasks. When the user wishes to return to active play, the user can stop the AI character functionality, and resume user control. In one embodiment, the automated game play is paused before handing off control back to the user. In that manner, game play of the user continues without user attention when automated game play control if performed.

In one embodiment, the AI controlled character will have and/or control different characters based on what is happening in the gaming environment. The AI character may be representative of the user. That is, the AI character grows organically as the gaming environment evolves. As such, in a competitive multi-player game, the user can allow the game play controller to take over the game play of the user while the user is away. For example, some multi-player sessions may last multiple hours, and the user may need a break, but still wants to maintain progress or may not want to be eliminated from the game during the break. Because the AI controlled character simulates the game play of the user, the other players in the multi-player session may be unaware of the automated game play control.

Figure 3B:
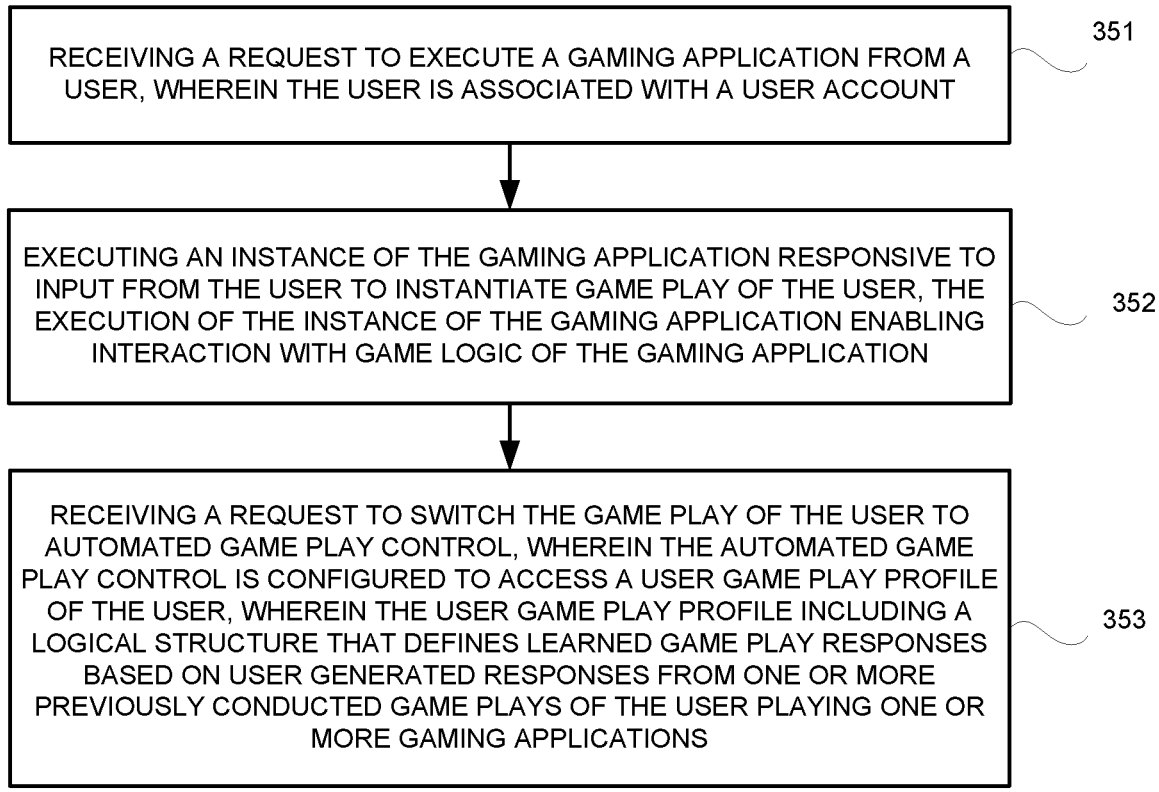
FIG. 3B is a flow diagram illustrating steps in a method for providing gaming control responsive to a request from a user to switch game play to automated game play control, in accordance with one embodiment of the present disclosure.

FIG. 3B is a flow diagram illustrating steps in a method for providing gaming control responsive to a request from a user to switch game play to automated game play control, in accordance with one embodiment of the present disclosure. At 351, the method includes receiving a request to execute a gaming application from a user (e.g., client device of the user). The user is associated with a user account, wherein the account provides access to at least one game profile of the user. At 352, the method includes executing an instance of the gaming application responsive to input from the user. The instance of the gaming application enables interaction with game logic of the gaming application to instantiate game play of the user.

At 353, the method includes receiving a request to switch the game play of the user to automated game play control, wherein the automated game play control is configured to access the user game play profile of the user. In particular, the user game play profile includes a logical structure that defines learned game play responses based on user generated responses from one or more previously conducted game plays of the user playing one or more gaming applications. For example, a user response may be defined or associated with a specific task, such that the response is given to address that task. In another example, a user response may be defined or associated with a task type, such that the response is given to address tasks of that task type. As such, the automated game play control is performed based on the user game play profile, wherein the user game play profile of a user defines a user game play style that simulates the user game play. Generation of the user game play profile was previously described in relation to FIG. 3A, and includes monitoring previous game play of the user. For example, learned responses to tasks of a one or more task types are defined in the user game play profile by monitoring and analyzing previous responses by the user in the previous game play. In the automated game play control, the method includes controlling an instance of the first gaming application based on the user game play style of defined in the user game play profile.

In one embodiment, the request may include a request to stand-in for the user playing the gaming application. The request may be delivered so that the user may step away from the game, or may be so that the user is able to get beyond a difficult part of the gaming application, or may be generated for other reasons.

A user may request assistance from the game cloud system, in one embodiment. That is, the user initiates the assistance provided by the game cloud system. For example, the user may be stuck on a task (e.g., how to open the green door?), and the user is able to query the gaming system or game cloud system for help. In one implementation, the query is converted into text or video form, such as an annotated video clip that is broadcasted to a network of helpers (e.g., experts in gaming). As such, the annotated video clip may be sent to expert players who then submit their answers. The answers may be presented in any form. The plurality of answers may be analyzed to determine an appropriate response to the given task, such as the most common response taken to accomplish the task, or quickest, or riskiest, etc. The appropriate response may be driven by the user, or may be driven by the user game play profile, such as matching the response to the game play style of the user. The answers and appropriate responses to tasks may be stored in a game knowledge database (e.g., in the form of Game Faqs), so that they can be later accessed, and used to form responses in default or user game play profiles.

In one embodiment, the automated game play control is limited to a period of time. That is, there is a hard stop to the automated game play control after a predefined period of time. In that manner, a game play cannot be completely automated, such as when a user is participating in a multi-player gaming session in view of fairness to the other users. Also, this prevents an escalating war of automated control, wherein all users will tend to use automated game control in order to win the multi-player gaming session.

In addition, the user may control how the automated game control is performed. For example, a progress control factor is received and/or defined in the request for assistance. The progress control factor may indicate a low progress, such that a status quo in the game play is maintained. On the other hand, when the progress control factor indicates high progress, the game play may be more aggressive in order to make the most progress as possible through the gaming application in a limited amount of time.

In addition, the user may control how aggressive the user game play style is defined. For example, an aggressiveness control factor for the user game play style is received and/or defined in the request, wherein the aggressiveness control factor defines a level of aggressiveness when playing the first gaming application. Aggressiveness may not necessarily be directly related to progress through a game, in one embodiment, but instead may further define how a gaming application is played. For example, aggressiveness may define how a character should act when presented with a set of circumstances. A high level of aggressiveness may include little or no time for assessing the circumstances and related consequences, whereas a lower level of aggressiveness may reflect an assessment of the circumstances and related consequences before any actions are taken within the automated game play.

While specific embodiments have been provided that illustrate the provision of gaming control to a user participating in a gaming application in a single-player mode or multi-player mode, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multi-player video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the embodiments described herein may be executed on any type of client device. In some embodiments, the client device is a head mounted display (HMD).

Figure 4:
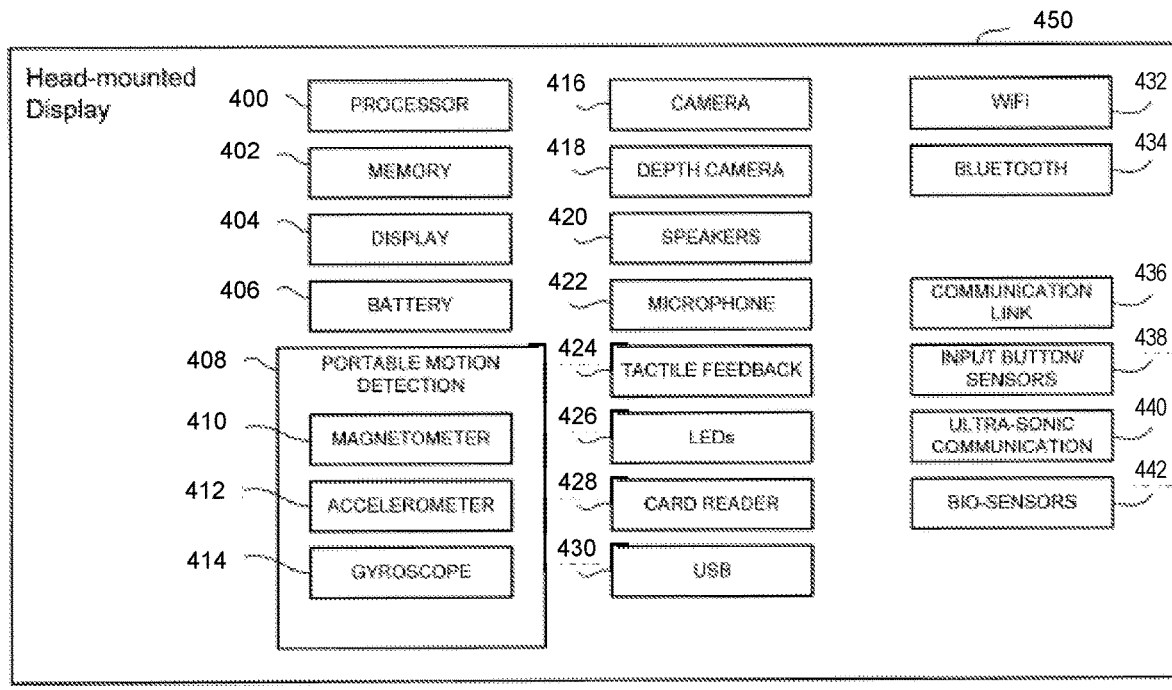
FIG. 4 is a diagram illustrating components of a head-mounted display, in accordance with one embodiment of the disclosure.

FIG. 4, a diagram illustrating components of a head-mounted display 450 is shown, in accordance with an embodiment of the disclosure. The head-mounted display 450 includes a processor 400 for executing program instructions. A memory 402 is provided for storage purposes, and may include both volatile and non-volatile memory. A display 404 is included which provides a visual interface that a user may view. A battery 406 is provided as a power source for the head-mounted display 450. A motion detection module 408 may include any of various kinds of motion sensitive hardware, such as a magnetometer 410, an accelerometer 412, and a gyroscope 414.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 412 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 410 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 412 is used together with magnetometer 410 to obtain the inclination and azimuth of the head-mounted display 450.

A gyroscope is a device for measuring or maintaining orientation, based on the principles of angular momentum. In one embodiment, three gyroscopes 414 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 416 is provided for capturing images and image streams of a real environment. More than one camera may be included in the head-mounted display 450, including a camera that is rear-facing (directed away from a user when the user is viewing the display of the head-mounted display 450), and a camera that is front-facing (directed towards the user when the user is viewing the display of the head-mounted display 450). Additionally, a depth camera 418 may be included in the head-mounted display 450 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 450 includes speakers 420 for providing audio output. Also, a microphone 422 may be included for capturing audio from the real environment, including sounds from the ambient environment, speech made by the user, etc. The head-mounted display 450 includes tactile feedback module 424 for providing tactile feedback to the user. In one embodiment, the tactile feedback module 424 is capable of causing movement and/or vibration of the head-mounted display 450 so as to provide tactile feedback to the user.

LEDs 426 are provided as visual indicators of statuses of the head-mounted display 450. For example, an LED may indicate battery level, power on, etc. A card reader 428 is provided to enable the head-mounted display 450 to read and write information to and from a memory card. A USB interface 430 is included as one example of an interface for enabling connection of peripheral devices, or connection to other devices, such as other portable devices, computers, etc. In various embodiments of the head-mounted display 450, any of various kinds of interfaces may be included to enable greater connectivity of the head-mounted display 450.

A WiFi module 432 is included for enabling connection to the Internet via wireless networking technologies. Also, the head-mounted display 450 includes a Bluetooth module 434 for enabling wireless connection to other devices. A communications link 436 may also be included for connection to other devices. In one embodiment, the communications link 436 utilizes infrared transmission for wireless communication. In other embodiments, the communications link 436 may utilize any of various wireless or wired transmission protocols for communication with other devices.

Input buttons/sensors 438 are included to provide an input interface for the user. Any of various kinds of input interfaces may be included, such as buttons, touchpad, joystick, trackball, etc. An ultra-sonic communication module 440 may be included in head-mounted display 450 for facilitating communication with other devices via ultra-sonic technologies.

Bio-sensors 442 are included to enable detection of physiological data from a user. In one embodiment, the bio-sensors 442 include one or more dry electrodes for detecting bio-electric signals of the user through the user's skin.

The foregoing components of head-mounted display 450 have been described as merely exemplary components that may be included in head-mounted display 450. In various embodiments of the disclosure, the head-mounted display 450 may or may not include some of the various aforementioned components. Embodiments of the head-mounted display 450 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 5:
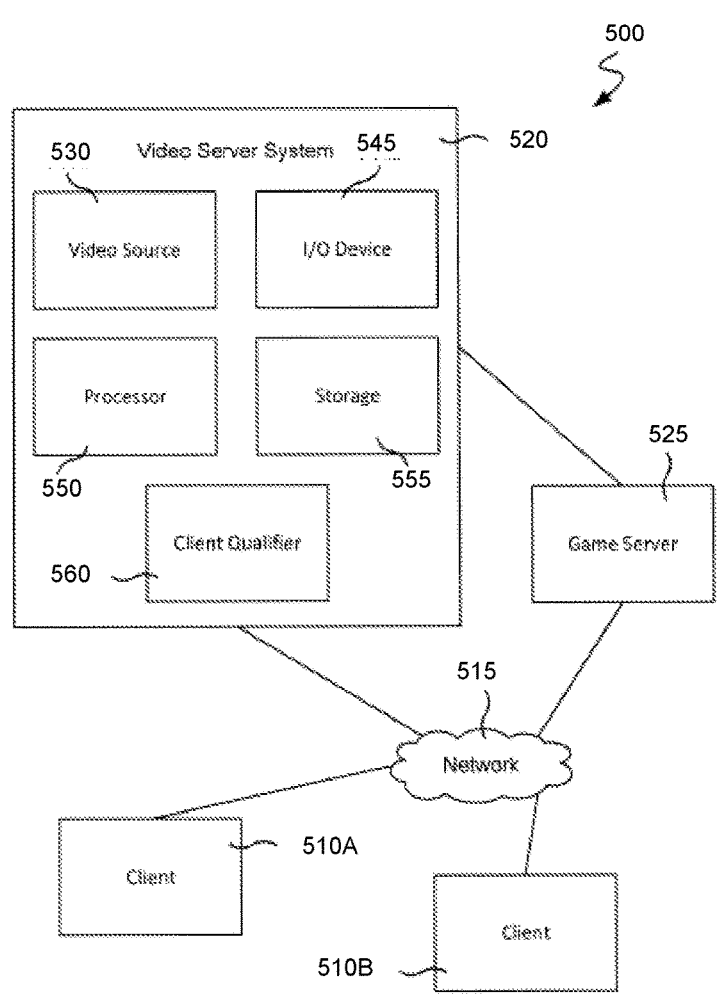
FIG. 5 is a block diagram of Game System, according to various embodiments of the disclosure. Game System is configured to provide a video stream to one or more clients via a network.

FIG. 5 is a block diagram of a Game System 500, according to various embodiments of the disclosure. Game System 500 is configured to provide a video stream to one or more Clients 510 via a Network 515. Game System 500 typically includes a Video Server System 520 and an optional game server 525. Video Server System 520 is configured to provide the video stream to the one or more Clients 510 with a minimal quality of service. For example, Video Server System 520 may receive a game command that changes the state of or a point of view within a video game, and provide Clients 510 with an updated video stream reflecting this change in state with minimal lag time. The Video Server System 520 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 520 frames per second. Although higher or lower frame rates are included in alternative embodiments of the disclosure.

Clients 510, referred to herein individually as 510A, 510B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 510 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 510 or on a separate device such as a monitor or television. Clients 510 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 510 are optionally geographically dispersed. The number of clients included in Game System 500 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 520 to deliver a game viewed through the HMD. In one embodiment, the game console receives the video stream from the video server system 520, and the game console forwards the video stream, or updates to the video stream, to the HMD for rendering.

Clients 510 are configured to receive video streams via Network 515. Network 515 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 510 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 510 may, but are not required to, further include systems configured for modifying received video. For example, a client may be configured to perform further rendering, to overlay one video image on another video image, to crop a video image, and/or the like. For example, Clients 510 may be configured to receive various types of video frames, such as I-frames, P-frames and B-frames, and to process these frames into images for display to a user. In some embodiments, a member of Clients 510 is configured to perform further rendering, shading, conversion to 3-D, or like operations on the video stream. A member of Clients 510 is optionally configured to receive more than one audio or video stream. Input devices of Clients 510 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 510 is generated and provided by Video Server System 520. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 510 are typically configured to receive inputs from a user. These inputs may include game commands configured to change the state of the video game or otherwise affect gameplay. The game commands can be received using input devices and/or may be automatically generated by computing instructions executing on Clients 510. The received game commands are communicated from Clients 510 via Network 515 to Video Server System 520 and/or Game Server 525. For example, in some embodiments, the game commands are communicated to Game Server 525 via Video Server System 520. In some embodiments, separate copies of the game commands are communicated from Clients 510 to Game Server 525 and Video Server System 520. The communication of game commands is optionally dependent on the identity of the command. Game commands are optionally communicated from Client 510A through a different route or communication channel that that used to provide audio or video streams to Client 510A.

Game Server 525 is optionally operated by a different entity than Video Server System 520. For example, Game Server 525 may be operated by the publisher of a multiplayer game. In this example, Video Server System 520 is optionally viewed as a client by Game Server 525 and optionally configured to appear from the point of view of Game Server 525 to be a prior art client executing a prior art game engine. Communication between Video Server System 520 and Game Server 525 optionally occurs via Network 515. As such, Game Server 525 can be a prior art multiplayer game server that sends game state information to multiple clients, one of which is game server system 520. Video Server System 520 may be configured to communicate with multiple instances of Game Server 525 at the same time. For example, Video Server System 520 can be configured to provide a plurality of different video games to different users. Each of these different video games may be supported by a different Game Server 525 and/or published by different entities. In some embodiments, several geographically distributed instances of Video Server System 520 are configured to provide game video to a plurality of different users. Each of these instances of Video Server System 520 may be in communication with the same instance of Game Server 525. Communication between Video Server System 520 and one or more Game Server 525 optionally occurs via a dedicated communication channel. For example, Video Server System 520 may be connected to Game Server 525 via a high bandwidth channel that is dedicated to communication between these two systems.

Video Server System 520 comprises at least a Video Source 530, an I/O Device 545, a Processor 550, and non-transitory Storage 555. Video Server System 520 may include one computing device or be distributed among a plurality of computing devices. These computing devices are optionally connected via a communications system such as a local area network.

Video Source 530 is configured to provide a video stream, e.g., streaming video or a series of video frames that form a moving picture. In some embodiments, Video Source 530 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 525. Game Server 525 may maintain a copy of the state of the game based on game commands received from multiple players using geographically disperse clients. In these cases, the game state is provided by Game Server 525 to Video Source 530, wherein a copy of the game state is stored and rendering is performed. Game Server 525 may receive game commands directly from Clients 510 via Network 515, and/or may receive game commands via Video Server System 520.

Video Source 530 typically includes rendering logic, e.g., hardware, firmware, and/or software stored on a computer readable medium such as Storage 555. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 510. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 530 includes a video recording device such as a camera. This camera may be used to generate delayed or live video that can be included in the video stream of a computer game. The resulting video stream optionally includes both rendered images and images recorded using a still or video camera. Video Source 530 may also include storage devices configured to store previously recorded video to be included in a video stream. Video Source 530 may also include motion or positioning sensing devices configured to detect motion or position of an object, e.g., person, and logic configured to determine a game state or produce video-based on the detected motion and/or position.

Video Source 530 is optionally configured to provide overlays configured to be placed on other video. For example, these overlays may include a command interface, log in instructions, messages to a game player, images of other game players, video feeds of other game players (e.g., webcam video). In embodiments of Client 510A including a touch screen interface or a gaze detection interface, the overlay may include a virtual keyboard, joystick, touch pad, and/or the like. In one example of an overlay a player's voice is overlaid on an audio stream. Video Source 530 optionally further includes one or more audio sources.

In embodiments wherein Video Server System 520 is configured to maintain the game state based on input from more than one player, each player may have a different point of view comprising a position and direction of view. Video Source 530 is optionally configured to provide a separate video stream for each player based on their point of view. Further, Video Source 530 may be configured to provide a different frame size, frame data size, and/or encoding to each of Client 510. Video Source 530 is optionally configured to provide 3-D video.

I/O Device 545 is configured for Video Server System 520 to send and/or receive information such as video, commands, requests for information, a game state, gaze information, device motion, device location, user motion, client identities, player identities, game commands, security information, audio, and/or the like. I/O Device 545 typically includes communication hardware such as a network card or modem. I/O Device 545 is configured to communicate with Game Server 525, Network 515, and/or Clients 510.

Processor 550 is configured to execute logic, e.g. software, included within the various components of Video Server System 520 discussed herein. For example, Processor 550 may be programmed with software instructions in order to perform the functions of Video Source 530, Game Server 525, and/or a Client Qualifier 560. Video Server System 520 optionally includes more than one instance of Processor 550. Processor 550 may also be programmed with software instructions in order to execute commands received by Video Server System 520, or to coordinate the operation of the various elements of Game System 500 discussed herein. Processor 550 may include one or more hardware device. Processor 550 is an electronic processor.

Storage 555 includes non-transitory analog and/or digital storage devices. For example, Storage 555 may include an analog storage device configured to store video frames. Storage 555 may include a computer readable digital storage, e.g. a hard drive, an optical drive, or solid state storage. Storage 515 is configured (e.g. by way of an appropriate data structure or file system) to store video frames, artificial frames, a video stream including both video frames and artificial frames, audio frame, an audio stream, and/or the like. Storage 555 is optionally distributed among a plurality of devices. In some embodiments, Storage 555 is configured to store the software components of Video Source 530 discussed elsewhere herein. These components may be stored in a format ready to be provisioned when needed.

Video Server System 520 optionally further comprises Client Qualifier 560. Client Qualifier 560 is configured for remotely determining the capabilities of a client, such as Clients 510A or 510B. These capabilities can include both the capabilities of Client 510A itself as well as the capabilities of one or more communication channels between Client 510A and Video Server System 520. For example, Client Qualifier 560 may be configured to test a communication channel through Network 515.

Client Qualifier 560 can determine (e.g., discover) the capabilities of Client 510A manually or automatically. Manual determination includes communicating with a user of Client 510A and asking the user to provide capabilities. For example, in some embodiments, Client Qualifier 560 is configured to display images, text, and/or the like within a browser of Client 510A. In one embodiment, Client 510A is an HMD that includes a browser. In another embodiment, client 510A is a game console having a browser, which may be displayed on the HMD. The displayed objects request that the user enter information such as operating system, processor, video decoder type, type of network connection, display resolution, etc. of Client 510A. The information entered by the user is communicated back to Client Qualifier 560.

Automatic determination may occur, for example, by execution of an agent on Client 510A and/or by sending test video to Client 510A. The agent may comprise computing instructions, such as java script, embedded in a web page or installed as an add-on. The agent is optionally provided by Client Qualifier 560. In various embodiments, the agent can find out processing power of Client 510A, decoding and display capabilities of Client 510A, lag time reliability and bandwidth of communication channels between Client 510A and Video Server System 520, a display type of Client 510A, firewalls present on Client 510A, hardware of Client 510A, software executing on Client 510A, registry entries within Client 510A, and/or the like.

Client Qualifier 560 includes hardware, firmware, and/or software stored on a computer readable medium. Client Qualifier 560 is optionally disposed on a computing device separate from one or more other elements of Video Server System 520. For example, in some embodiments, Client Qualifier 560 is configured to determine the characteristics of communication channels between Clients 510 and more than one instance of Video Server System 520. In these embodiments the information discovered by Client Qualifier can be used to determine which instance of Video Server System 520 is best suited for delivery of streaming video to one of Clients 510.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising
monitoring a plurality of game plays of a user playing a plurality of video games;
identifying a plurality of tasks presented to the user within the plurality of game plays;
identifying a plurality of action states defining a plurality of actions taken by the user when addressing the plurality of tasks within the plurality of game plays;
identifying a plurality of action results defining a plurality of results of the user in addressing the plurality of tasks within the plurality of game plays;
processing the plurality of tasks and the plurality of action states and the plurality of action results to identify a plurality of features that are labeled and classified; and
building an artificial intelligence (AI) model of the user by propagating the plurality of features that are labeled and classified through a deep learning engine,
wherein the deep learning engine applies a deep learning algorithm and includes a network of interconnected nodes within an input layer, one or more hidden layers, and an output layer,
wherein the AI model of the user is configured to predict a game play style of the user including predicting a player response for a task, presented in a game play of the user playing a video game, provided as an input.

2. The method of claim 1, further comprising:
executing an instance of the video game responsive to stored input commands of the user playing the video game in a stored game play;
detecting one or more failed responses of a character to complete the task in the stored game play;
receiving a request originating from the user to automatically complete the task; and
controlling the character in the instance of the video game based on the game play style of the user using the AI model.

3. The method of claim 1, further comprising:
executing an instance of the video game responsive to one or more input commands of the user to enable the game play of the user playing the video game, wherein a character is controlled in the instance of the video game based on the one or more input commands of the user; and
blocking execution of the one or more input commands of the user while the character is controlled using the AI model.

4. The method of claim 3, further comprising:
receiving a request originating from the user for automatic control of the game play of the user using the AI model.

5. The method of claim 3, further comprising:
receiving a request originating from the user to terminate control of the character using the AI model.

6. The method of claim 3, further comprising:
detecting a failed response by the character to accomplish the task in the game play of the user;
sending an invitation to a device of the user to automatically complete the task using the AI model; and
receiving a request originating from the user for automatic control of the game play of the user using the AI model for purposes of completing the task.

7. The method of claim 1, further comprising:
wherein the plurality of action results is processed through the deep learning engine to build the AI model.

8. A non-transitory computer-readable medium storing a computer program for assisting game play, the computer-readable medium comprising:
program instructions for monitoring a plurality of game plays of a user playing a plurality of video games;
program instructions for identifying a plurality of tasks presented to the user within the plurality of game plays;
program instructions for identifying a plurality of action states defining a plurality of actions taken by the user when addressing the plurality of tasks within the plurality of game plays;
program instructions for identifying a plurality of action results defining a plurality of results of the user in addressing the plurality of tasks within the plurality of game plays;
program instructions for processing the plurality of tasks and the plurality of action states to identify a plurality of features that are labeled and classified; and
program instructions for building an artificial intelligence (AI) model of the user by propagating the plurality of features that are labeled and classified through a deep learning engine,
wherein the deep learning engine applies a deep learning algorithm and includes a network of interconnected nodes within an input layer, one or more hidden layers, and an output layer,
wherein the AI model of the user is configured to predict a game play style of the user including predicting a player response for a task, presented in a game play of the user playing a video game, provided as an input.

9. The non-transitory computer-readable medium of claim 8, further comprising:
program instructions for executing an instance of the video game responsive to stored input commands of the user playing the video game in a stored game play;
program instructions for detecting one or more failed responses of a character to complete the task in the stored game play;
program instructions for receiving a request originating from the user to automatically complete the task; and
program instructions for controlling the character in the instance of the video game based on the game play style of the user using the AI model.

10. The non-transitory computer-readable medium of claim 8, further comprising:
program instructions for executing an instance of the video game responsive to one or more input commands of the user to enable the game play of the user playing the video game, wherein a character is controlled in the instance of the video game based on the one or more input commands of the user; and
program instructions for blocking execution of the one or more input commands of the user while the character is controlled using the AI model.

11. The non-transitory computer-readable medium of claim 10, further comprising:
program instructions for receiving a request originating from the user for automatic control of the game play of the user using the AI model.

12. The non-transitory computer-readable medium of claim 10, further comprising:

program instructions for receiving a request originating from the user to terminate control of the character using the AI model.

13. The non-transitory computer-readable medium of claim 10, further comprising:
    program instructions for detecting a failed response by the character to accomplish the task in the game play of the user;
    program instructions for sending an invitation to a device of the user to automatically complete the task using the AI model; and
    program instructions for receiving a request originating from the user for automatic control of the game play of the user using the AI model for purposes of completing the task.

14. The non-transitory computer-readable medium of claim 8, further comprising:
    wherein the plurality of action results is processed through the deep learning engine to build the AI model.

15. A computer system comprising:
    a processor; and
    memory coupled to the processor and having stored therein instructions that, if executed by the computer system, cause the computer system to execute a method, the method comprising:
        monitoring a plurality of game plays of a user playing a plurality of video games;
        identifying a plurality of tasks presented to the user within the plurality of game plays;
        identifying a plurality of action states defining a plurality of actions taken by the user when addressing the plurality of tasks within the plurality of game plays;
        identifying a plurality of action results defining a plurality of results of the user in addressing the plurality of tasks within the plurality of game plays;
        processing the plurality of tasks and the plurality of action states and the plurality of action results to identify a plurality of features that are labeled and classified; and
        building an artificial intelligence (AI) model of the user by propagating the plurality of features that are labeled and classified through a deep learning engine,
        wherein the deep learning engine applies a deep learning algorithm and includes a network of interconnected nodes within an input layer, one or more hidden layers, and an output layer,
        wherein the AI model of the user is configured to predict a game play style of the user including predicting a player response for a task, presented in a game play of the user playing a video game, provided as an input.

16. The computer system of claim 15, the method further comprising:
    executing an instance of the video game responsive to stored input commands of the user playing the video game in a stored game play;
    detecting one or more failed responses of a character to complete the task in the stored game play;
    receiving a request originating from the user to automatically complete the task; and
    controlling the character in the instance of the video game based on the game play style of the user using the AI model.

17. The computer system of claim 15, the method further comprising:
    executing an instance of the video game responsive to one or more input commands of the user to enable the game play of the user playing the video game, wherein a character is controlled in the instance of the video game based on the one or more input commands of the user; and
    blocking execution of the one or more input commands of the user while the character is controlled using the AI model.

18. The computer system of claim 17, the method further comprising:
    receiving a request originating from the user for automatic control of the game play of the user using the AI model.

19. The computer system of claim 17, the method further comprising:
    receiving a request originating from the user to terminate control of the character using the AI model.

20. The computer system of claim 17, the method further comprising:
    detecting a failed response by the character to accomplish the task in the game play of the user;
    sending an invitation to a device of the user to automatically complete the task using the AI model; and
    receiving a request originating from the user for automatic control of the game play of the user using the AI model for purposes of completing the task.

* * * * *